(12) United States Patent
Tsukada et al.

(10) Patent No.: US 10,838,479 B2
(45) Date of Patent: Nov. 17, 2020

(54) INFORMATION PROCESSING SYSTEM, MANAGEMENT DEVICE, AND METHOD OF CONTROLLING INFORMATION PROCESSING SYSTEM

(71) Applicant: FUJITSU LIMITED, Kawasaki (JP)

(72) Inventors: Kouichi Tsukada, Nagano (JP); Kazumi Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 16/058,570

(22) Filed: Aug. 8, 2018

(65) Prior Publication Data

US 2019/0050042 A1    Feb. 14, 2019

(30) Foreign Application Priority Data

Aug. 14, 2017  (JP) .................................. 2017-156538

(51) Int. Cl.
| | | |
|---|---|---|
| *G06F 1/3206* | (2019.01) | |
| *G06F 1/26* | (2006.01) | |
| *G06F 1/3287* | (2019.01) | |
| *G06F 1/3203* | (2019.01) | |

(52) U.S. Cl.
CPC ............. *G06F 1/3206* (2013.01); *G06F 1/26* (2013.01); *G06F 1/3203* (2013.01); *G06F 1/3287* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 6,594,771 | B1 * | 7/2003 | Koerber | G06F 1/26 713/330 |
| 7,389,367 | B2 * | 6/2008 | Baba | G06F 3/0605 709/223 |
| 2006/0005057 | A1 * | 1/2006 | Nalawadi | G06F 1/3203 713/320 |
| 2016/0202744 | A1 * | 7/2016 | Castro-Leon | G06F 1/329 713/310 |

FOREIGN PATENT DOCUMENTS

| | | |
|---|---|---|
| JP | 08-286786 | 11/1996 |
| JP | 2001-249908 | 9/2001 |
| JP | 2016-009222 | 1/2016 |

\* cited by examiner

*Primary Examiner* — Kim Huynh
*Assistant Examiner* — Eric Chang
(74) *Attorney, Agent, or Firm* — Fujitsu Patent Center

(57) ABSTRACT

A management device includes a processor that stores, in a second memory, power source information indicating first states of power sources of respective first electronic apparatuses included in an electronic apparatus group. The processor instructs, upon receiving a first instruction, the first electronic apparatuses identified by first apparatus information held in a first memory to transition the respective first states. The processor receives a second instruction to add a new electronic apparatus to the electronic apparatus group. The processor suppresses, in a case where any one of the first states is being transitioned, second apparatus information of the new electronic apparatus from being stored in the first memory. The processor stores the second apparatus information in the first memory in a case where transition of all the first states has been completed, and matches a second state of a power source of the new electronic apparatus with the first states.

9 Claims, 16 Drawing Sheets

FIG. 7

MASTER NODE OF GrA

| Gr | GrA | | STG1 | GrB | | | GrC | | STG3 |
|---|---|---|---|---|---|---|---|---|---|
| NODE | SV1 | SV5 | | SV2 | SV6 | SV3 | SV7 | | |

| Gr | GrA | | | GrB | | | GrC | | STG3 |
|---|---|---|---|---|---|---|---|---|---|
| NODE | SV1 | SV5 | STG1 | SV2 | SV6 | SV3 | SV7 | STG1 | |

| GST | | STDY | |
|---|---|---|---|
| NODE | SV1 | SV5 | STG1 |
| NST | ON | ON | ON |

MASTER NODE OF GrB

| Gr | GrA | | STG1 | GrB | | | GrC | | STG3 |
|---|---|---|---|---|---|---|---|---|---|
| NODE | SV1 | SV5 | | SV2 | SV6 | SV3 | SV7 | | |

| Gr | GrA | | | GrB | | | GrC | | STG3 |
|---|---|---|---|---|---|---|---|---|---|
| NODE | SV1 | SV5 | STG1 | SV2 | SV6 | SV3 | SV7 | STG1 | |

| GST | | STDY |
|---|---|---|
| NODE | SV2 | SV6 |
| NST | ON | ON |

MASTER NODE OF GrC

| Gr | GrA | | STG1 | GrB | | | GrC | | STG3 |
|---|---|---|---|---|---|---|---|---|---|
| NODE | SV1 | SV5 | | SV2 | SV6 | SV3 | SV7 | | |

| Gr | GrA | | | GrB | | | GrC | | STG3 |
|---|---|---|---|---|---|---|---|---|---|
| NODE | SV1 | SV5 | STG1 | SV2 | SV6 | SV3 | SV7 | STG1 | |

| GST | | STDY | |
|---|---|---|---|
| NODE | SV3 | SV7 | STG3 |
| NST | OFF | OFF | →OFF |

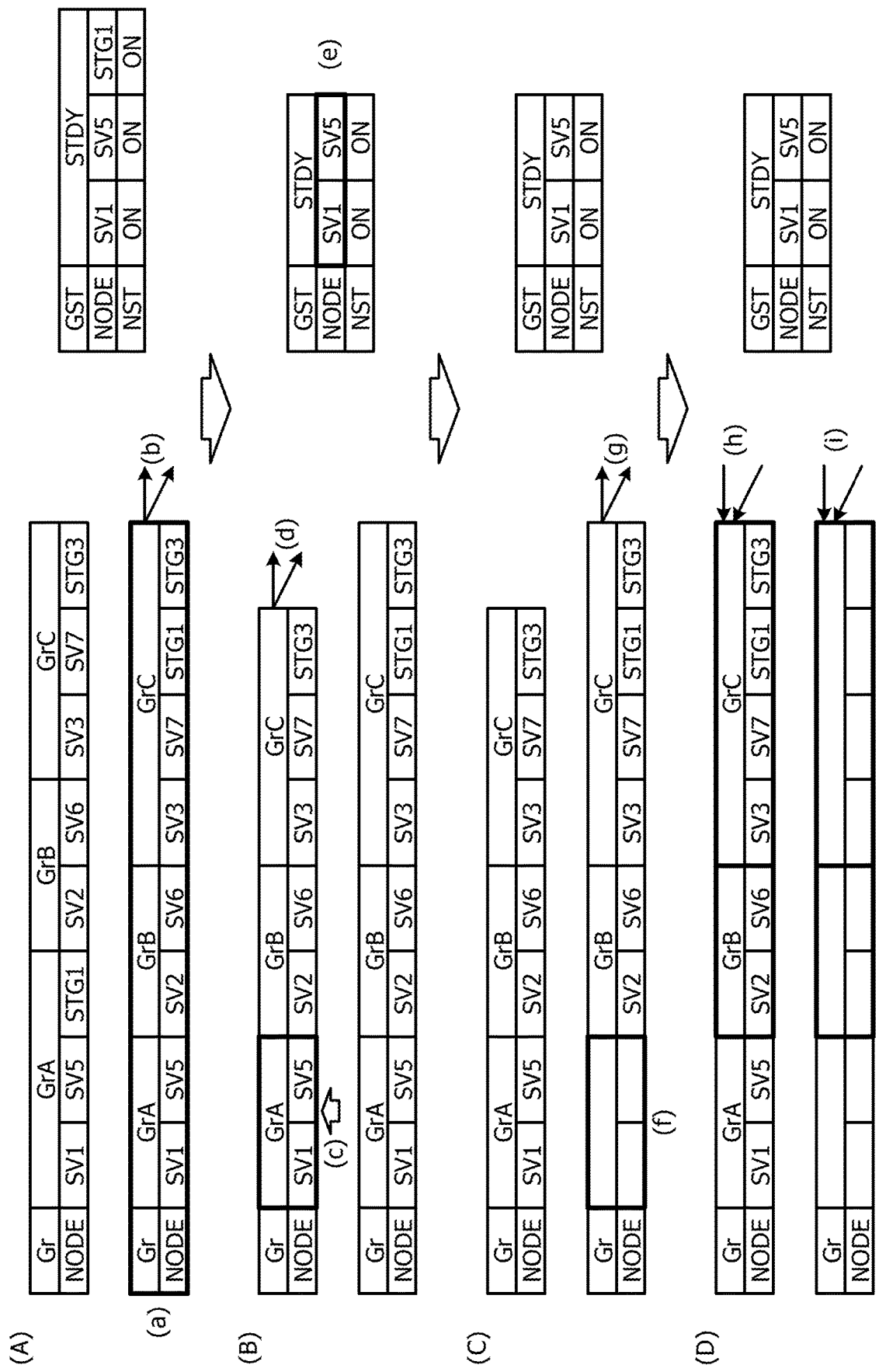

INFORMATION PROCESSING SYSTEM, MANAGEMENT DEVICE, AND METHOD OF CONTROLLING INFORMATION PROCESSING SYSTEM

CROSS-REFERENCE TO RELATED APPLICATION

This application is based upon and claims the benefit of priority of the prior Japanese Patent Application No. 2017-156538, filed on Aug. 14, 2017, the entire contents of which are incorporated herein by reference.

FIELD

The embodiments discussed herein are related to an information processing system, a management device, and a method of controlling the information processing system.

BACKGROUND

There has been proposed a power source schedule device which divides multiple apparatuses included in an information processing system into a plurality of groups, and manages the turn-on and turn-off of the power sources of the apparatuses for each group according to a schedule created for each group. In a computer system including multiple computers sharing a storage, each group of the computers is activated at a time interval, so that the concentration of accesses to the storage at the time of the activation of the computers is avoided. When the turn-on or turn-off of the power sources of the multiple electronic apparatuses included in the system is interlocked with each other, an electronic apparatus of an interlocking source of a power source detects a state of a power source of an electronic apparatus of an interlocking destination of a power source, and transitions the state of the power source of the electronic apparatus of the interlocking destination of the power source.

Related techniques are disclosed in, for example, Japanese Laid-Open Patent Publication Nos. 8-286786, 2001-249908, and 2016-9222.

SUMMARY

According to an aspect of the present invention, provide is a management device including a first memory, a second memory, and a first processor coupled to the first memory and the second memory. The first memory is configured to hold first apparatus information for identifying each of electronic apparatuses included in a first electronic apparatus group. The second memory is configured to hold first power source information indicating first states of the power sources of the respective first electronic apparatuses. The first processor is configured to store the first power source information in the second memory. The first processor is configured to instruct, upon receiving a first instruction, the first electronic apparatuses identified by the first apparatus information held in the first memory to transition the respective first states. The first instruction instructs to turn on or turn off the power sources. The first processor is configured to receive a second instruction to add a new electronic apparatus to the first electronic apparatus group. The first processor is configured to suppress, in a case where the first power source information held in the second memory indicates that any one of the first states is being transitioned, second apparatus information of the new electronic apparatus from being stored in the first memory. The first processor is configured to store the second apparatus information in the first memory in a case where the first power source information held in the second memory indicates that transition of all the first states has been completed, and match a second state of a power source of the new electronic apparatus with the first states.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a view illustrating examples of a master group setting file, a temporary group setting file, and a power source state management file illustrated in FIG. 6;

FIG. 8 is a view illustrating an example of an operation of a server SV1 of a group GrA in the information processing system illustrated in FIG. 4;

DESCRIPTION OF EMBODIMENTS

In a case where a new apparatus is added to a group including multiple apparatuses while the power sources of the apparatuses in the group are being transitioned to be interlocked with each other, the state of the power source of the new apparatus may not match the states of the power sources of the apparatuses that are being transitioned. When the states of the power sources do not match each other, the state of the power source of the apparatus newly added to the group is caused to match the states of the power sources of the other apparatuses in the group, so that the process of adding the new apparatus to the group is completed. It is determined whether the states of the power sources of the multiple apparatuses included in the group match each other, for example, in the manner that an operator using the system including the apparatuses operates a terminal device so as to detect the state of the power source of each of the multiple apparatuses. When the states of the power sources do not match each other, the operator also operates the terminal device so as to change the state of the power source of the apparatus that is different from that of the other apparatuses.

As described above, since the process of determining whether the states of the power sources of the multiple apparatuses included in the group match each other to match the states of the power sources with each other is performed based on the instruction from the operator, a burden is caused to the operator. In order to reduce the burden to the operator, the addition of a new apparatus to the group is performed in a time period during which the power sources of the multiple apparatuses included in the group are not being transitioned. In this case, the operator sets the state of the power source of the new apparatus in accordance with the states of the power sources of the multiple apparatuses, and then, adds the new apparatus to the group.

Meanwhile, with the implementation of the large-scale system, the number of apparatuses of which power sources are caused to be transitioned in the interlocking manner has increased. As the number of apparatuses of which power sources are caused to be transitioned in the interlocking manner increases, the time required until the transition of the power sources is completed becomes longer. As a result, a time period in which the power sources of all the apparatuses included in the group are not being transitioned is relatively reduced, and as a result, it becomes difficult to take the timing for issuing an instruction to add a new apparatus to the group.

Hereinafter, embodiments of the present disclosure will be described with reference to the accompanying drawings.

Figure 1:
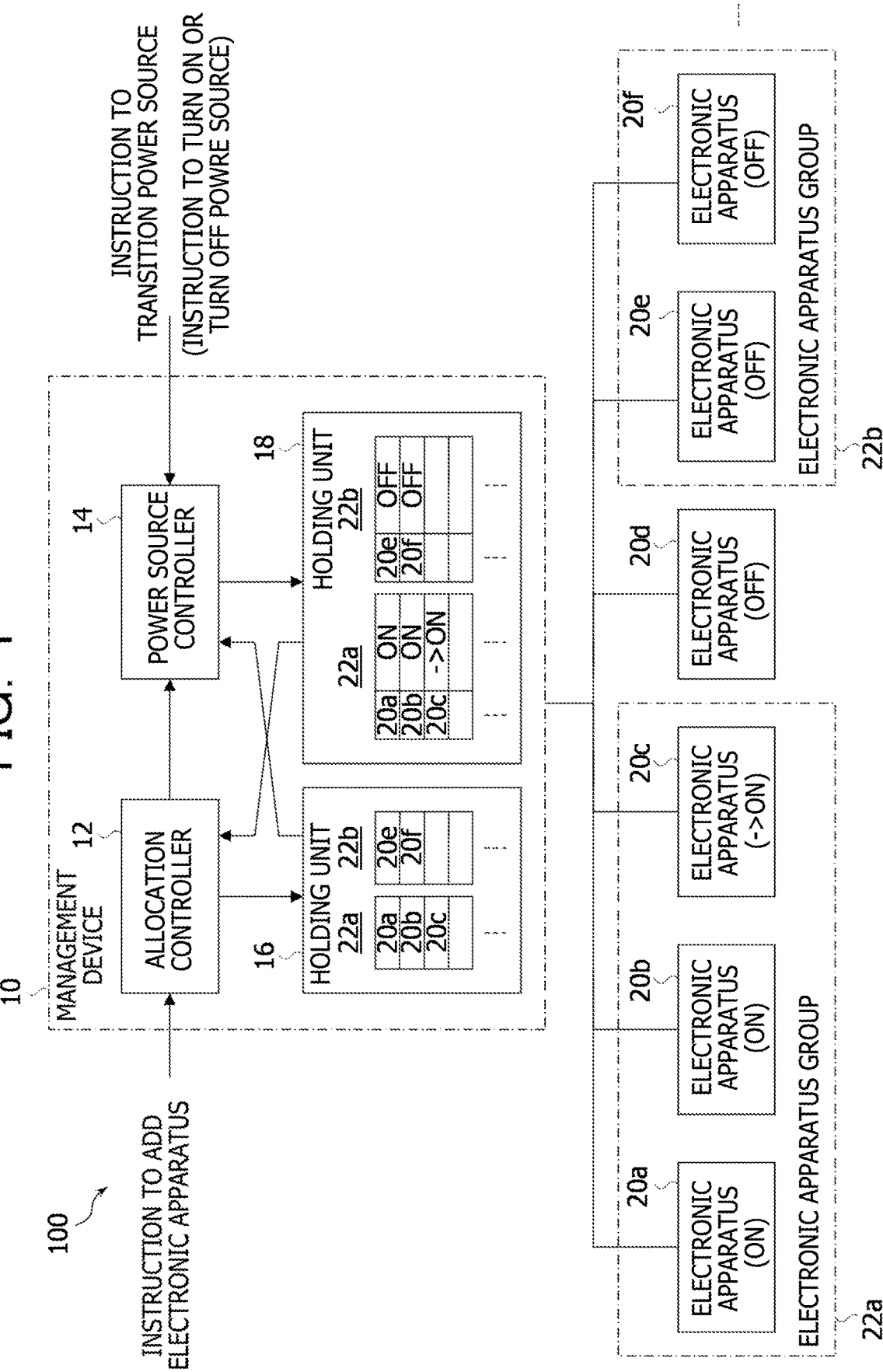
FIG. 1 is a diagram illustrating an example of a configuration of an information processing system.

FIG. 1 illustrates an example of a configuration of an information processing system. As illustrated in FIG. 1, an information processing system 100 includes a management device 10 and multiple electronic apparatuses 20 (20a, 20b, 20c, 20d, 20e, and 20f) connected to the management device 10 via, for example, a network. The number of the electronic apparatuses 20 connected to the management device 10 is not limited to the example illustrated in FIG. 1.

Each electronic apparatus 20 is either an information processing apparatus such as a server including an information processing unit that executes an information processing or an input/output device such as a storage that stores information. In addition, the electronic apparatus 20 may be an apparatus other than the information processing apparatus and the input/output device. In FIG. 1, the electronic apparatuses 20a, 20b, and 20c are allocated to an electronic apparatus group 22a, and the electronic apparatuses 20e and 20f are allocated to an electronic apparatus group 22b. The electronic apparatus 20d is not allocated to any of the electronic apparatus groups 22a and 22b. The electronic apparatuses 20a, 20b, and 20c are examples of first electronic apparatuses included in the electronic apparatus group 22a, and the electronic apparatuses 20e and 20f are examples of first electronic apparatuses included in the electronic apparatus group 22b. Each of the electronic apparatus groups 22a and 22b is a unit in which turn-on or turn-off of a power source is performed in an interlocking manner.

The management device 10 includes an allocation controller 12, a power source controller 14, and holding units 16 and 18. The holding unit 16 is an example of a first holding unit, and the holding unit 18 is an example of a second holding unit. Based on an instruction from the outside of the information processing system 100, the management device 10 performs a control to interlock the turn-on or turn-off of the power sources of the electronic apparatuses 20 included in the instructed electronic apparatus group 22. Further, based on an instruction from the outside of the information processing system 100, the management device 10 performs a control to change the allocation of the electronic apparatuses 20 included in the instructed electronic apparatus group 22. By the change of the allocation, a new electronic apparatus 20 instructed to be added is added to the electronic apparatus group 22, or an electronic apparatus 20 instructed to be deleted is deleted from the electronic apparatus group 22.

Although not specifically limited, the instruction to interlock the turn-on or turn-off of the power sources and the instruction to change the allocation of the electronic apparatuses 20 to the electronic apparatus group 22 are issued to the management device 10 from a terminal device connected to the information processing system 100. The terminal device is, for example, operated by an operator using the information processing system 100.

The holding unit 16 holds apparatus information for identifying each electronic apparatus 20 included in each of the electronic apparatus groups 22a and 22b. In other words, the electronic apparatuses 20 to be allocated to each of the electronic apparatus groups 22a and 22b are determined based on the apparatus information held in the holding unit 16. In the example illustrated in FIG. 1, the apparatus information held in the holding unit 16 is indicated by the reference numerals of the electronic apparatuses 20.

The holding unit 18 holds power source information indicating the states of the power sources of the electronic apparatuses 20 included in each of the electronic apparatus groups 22a and 22b. The power source information held by the holding unit 18 is an example of first power source information. In the holding unit 18, the power source information "ON" held in the areas corresponding to the electronic apparatuses 20a and 20b indicates that the power sources of the electronic apparatuses 20a and 20b are in a turn-on state. In the holding unit 18, the power source information "OFF" held in the areas corresponding to the electronic apparatuses 20e and 20f indicates that the power sources of the electronic apparatuses 20e and 20f are in a turn-off state.

Further, in the holding unit 18, the power source information "→ON" held in the area corresponding to the electronic apparatus 20c indicates that the power source of the electronic apparatus 20c is being transitioned from the turn-off state to the turn-on state. Although not illustrated in FIG. 1, in the holding unit 18, the power source information "→OFF" held in an area corresponding to an electronic apparatus 20 indicates that the power source of the electronic apparatus 20 is being transitioned from the turn-on state to the turn-off state. In addition, instead of the power source information "→ON" and "→OFF," common power source information indicating that a power source of an electronic apparatus 20 is being transitioned (e.g., "→") may be held in the area corresponding to the electronic apparatus 20.

When the power source information "→ON" is held in the area corresponding to any one of the electronic apparatuses 20 included in the electronic apparatus group 22 in the holding unit 18, it indicates that the power sources of the electronic apparatuses 20 included in the electronic apparatus group 22 are being turned on in the interlocking manner. In addition, when the power source information "→OFF" is held in the area corresponding to any one of the electronic apparatuses 20 included in the electronic apparatus group 22 in the holding unit 18, it indicates that the power sources of the electronic apparatuses 20 included in the electronic apparatus group 22 are being turned off in the interlocking manner. That is, by holding the power source information "→ON" or "→OFF" in the holding unit 18, for example, the allocation controller 12 that refers to the holding unit 18 may detect whether the power sources of the electronic apparatuses 20 included in the electronic apparatus group 22 are being transitioned. In other words, by referring to the power source information held in the holding unit 18, it may be detected whether the electronic apparatus group 22 is in the process of the transition of the power source.

In addition, in order to facilitate the descriptions, the power source information ("ON," "OFF," and "→ON") held in the holding unit 18 is attached to each electronic apparatus 20 as well. Based on an inquiry from the management device 10, each electronic apparatus 20 outputs either the information indicating the turn-on state of the power source or the information indicating the turn-off state of the power source, to the management device 10. For example, each electronic apparatus 20 outputs the information indicating the turn-off state of the power source until an activation process is completed, in response to an inquiry from the management device 10, and outputs the information indicating the turn-on state of the power source until a shutdown process is completed, in response to an inquiry from the management device 10.

After transferring an instruction to turn on the power source to the electronic apparatus 20, the management device 10 holds the power source information "→ON" in the holding unit 18 until receiving the information indicating the turn-on state of the power source from the electronic apparatus 20. In addition, after transferring an instruction to turn off the power source to the electronic apparatus 20, the management device 10 holds the power source information "→OFF" in the holding unit 18 until receiving the information indicating the turn-off state of the power source from the electronic apparatus 20. As a result, even when the electronic apparatus 20 does not have the function to hold and notify the information indicating that the power source is being transitioned, the management device 10 may refer to the power source information held by the holding unit 18 and determine whether the power source of the electronic apparatus 20 is being transitioned.

The allocation controller 12 performs a process of adding a new electronic apparatus 20 to the electronic apparatus group 22, when receiving an instruction to add the new electronic apparatus 20 to the electronic apparatus group 22. When the allocation controller 12 refers to the holding unit 18 and detects that the power sources of all the electronic apparatuses 20 included in the electronic apparatus group 22 to which the new electronic apparatus 20 is to be added are not being transitioned, the allocation controller 12 stores apparatus information of the new electronic apparatus 20 in the holding unit 16. When the apparatus information is stored in the holding unit 16, the new electronic apparatus 20 is allocated to the electronic apparatus group 22. Meanwhile, when the allocation controller 12 refers to the holding unit 18 and detects that the power source of any one of the electronic apparatuses 20 included in the electronic apparatus group 22 to which the new electronic apparatus 20 is to be added is being transitioned, the allocation controller 12 suppresses the storage of the apparatus information of the new electronic apparatus 20 in the holding unit 16.

When the apparatus information of the new electronic apparatus 20 is suppressed from being stored in the holding unit 16, the allocation controller 12 continues to refer to the power source information held in the holding unit 18. Then, based on the power source information held in the holding unit 18, when the allocation controller 12 detects that the transition of the power sources of all the electronic apparatuses 20 included in the electronic apparatus group 22 to which the new electronic apparatus 20 is to be added has been completed, the allocation controller 12 stores the apparatus information of the new electronic apparatus 20 in the holding unit 16. In addition, when the power source information held in the areas of the holding unit 18 which correspond to all the electronic apparatuses 20 included in the electronic apparatus group 22 indicates the turn-on state (or turn-off state), the allocation controller 12 detects that the transition of the power sources of all the electronic apparatuses 20 included in the electronic apparatus group 22 has been completed.

In addition, the allocation controller 12 refers to the holding unit 18 and determines whether the state of the power source of the new electronic apparatus 20 added to the electronic apparatus group 22 is the same as the states of the power sources of the other electronic apparatuses 20 included in the electronic apparatus group 22. The state of the power source of the new electronic apparatus 20 may be held in the holding unit 18 prior to the determination of the state of the power source or may be included in the instruction to add the new electronic apparatus 20 to the electronic apparatus group 22. Alternatively, the allocation controller 12 may inquire of the new electronic apparatus 20 about the state of the power source. As described above, based on the power source information held in the holding unit 18, the management device 10 may determine whether the state of the power source of the new electronic apparatus 20 is the same as the states of the power sources of the other electronic apparatuses 20 included in the electronic apparatus group 22. As a result, the operator is released from the work for detecting the states of the power sources of the electronic apparatuses 20 included in the electronic apparatus group 22.

When the state of the power source of the new electronic apparatus 20 is different from the states of the power sources of the other electronic apparatuses 20 included in the electronic apparatus group 22, the allocation controller 12 issues an instruction to match the state of the power source of the new electronic apparatus 20 with the states of the power sources of the other electronic apparatuses 20. Upon receiving the instruction to match the states of the power sources with each other from the allocation controller 12, the power source controller 14 instructs the transition of the power source to the new electronic apparatus. That is, without receiving an instruction from the operator, the management device 10 may match the state of the power source of the new electronic apparatus 20 with the states of the power sources of the other electronic apparatuses 20 included in the electronic apparatus group 22 based on the power source information held in the holding unit 18.

In addition, when receiving an instruction to transition the power source of any one of the electronic apparatuses 20 included in the electronic apparatus group 22, the power source controller 14 refers to the apparatus information held in the holding unit 16 in association with the electronic apparatus group 22 including the electronic apparatus 20 instructed to transition the power source thereof. Then, the power source controller 14 instructs the transition of the power source to the electronic apparatuses 20 indicated by the referred-to apparatus information. Here, the instruction to transition the power source is an instruction to either turn on or turn off the power source.

Upon receiving the instruction to turn on the power source, each electronic apparatus 20 transitions the power source from the turn-off state to the turn-on state. Upon receiving the instruction to turn off the power source, each electronic apparatus 20 transitions the power source from the turn-on state to the turn-off state. That is, based on the instruction to transition the power source of any one of the electronic apparatuses 20 included in the electronic apparatus group 22, the management device 10 may perform the power source interlocking operation to transition the power sources of all the electronic apparatuses included in the electronic apparatus group 22 to the same state.

In addition, the power source controller 14 sets the power source information "→ON" in the area of the holding unit 18 which corresponds to the electronic apparatus 20 being in the transition of the power source from the turn-off state to the turn-on state, among the electronic apparatuses 20 included in the electronic apparatus group 22. The power source controller 14 sets the power source information "→OFF" in the area of the holding unit 18 which corresponds to the electronic apparatus 20 being in the transition of the power source from the turn-on state to the turn-off state, among the electronic apparatuses 20 included in the electronic apparatus group 22.

For example, in FIG. 1, the management device 10 is performing the control to turn on the power sources of the electronic apparatuses 20a, 20b, and 20c included in the electronic apparatus group 22a based on the instruction to turn on the power sources. The power sources of the electronic apparatuses 20a and 20b are in the turn-on state ("ON") where the transition has been completed, and the power source of the electronic apparatus 20c is being transitioned from the turn-off state to the turn-on state ("→ON"). The power sources of the electronic apparatuses 20d, 20e, and 20f are in the turn-off state ("OFF").

Figure 2:
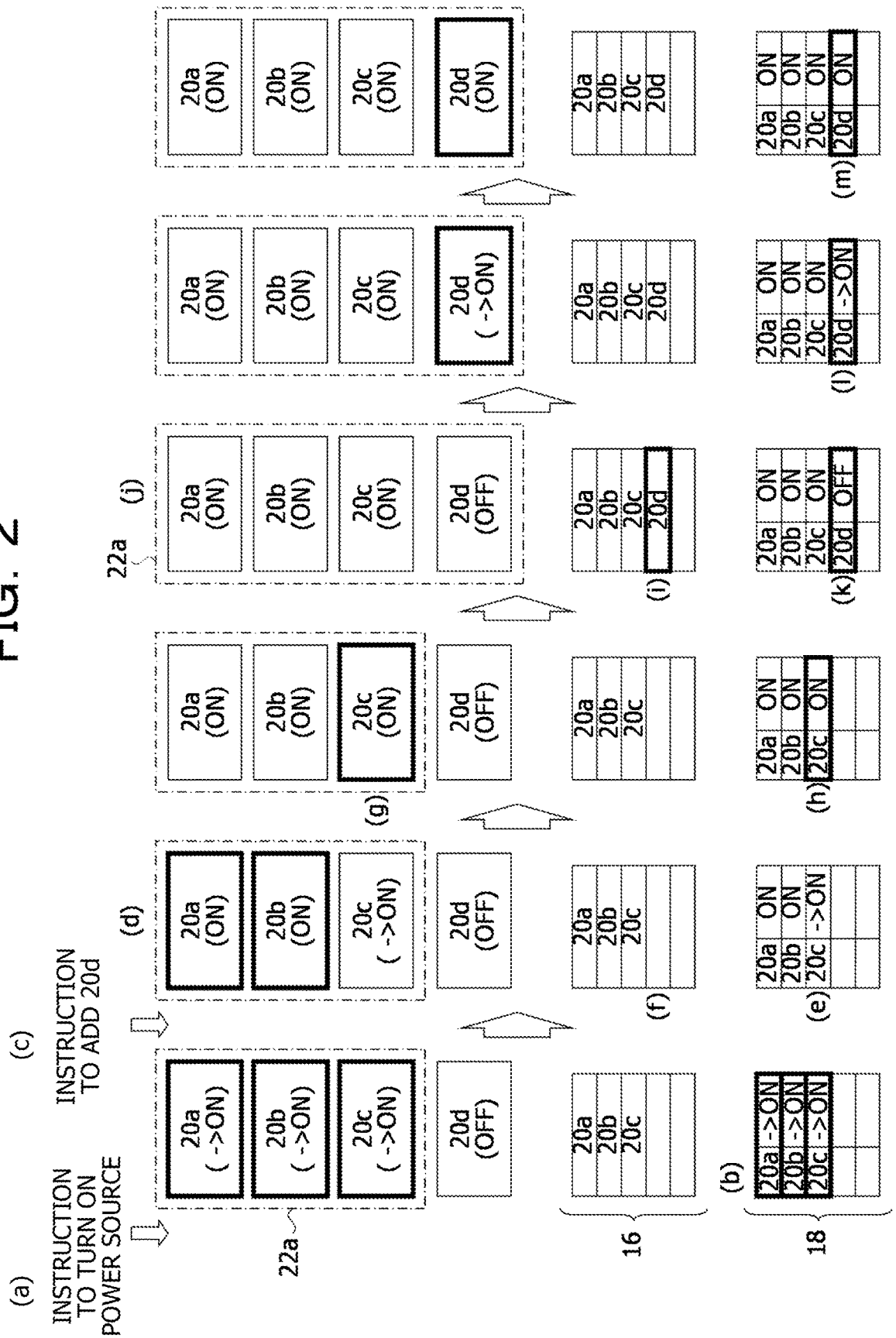
FIG. 2 is a diagram illustrating an example of an operation of the information processing system illustrated in FIG. 1.

FIG. 2 illustrates an example of the operation of the information processing system 100 illustrated in FIG. 1. FIG. 2 illustrates an example where an electronic apparatus 20d is added to the electronic apparatus group 22a illustrated in FIG. 1. FIG. 2 represents the information on the electronic apparatus group 22a, and omits the description of the information on the electronic apparatus group 22b. In FIG. 2, each thick frame indicates an element of which the state has changed from the previous state.

First, the management device 10 illustrated in FIG. 1 receives the instruction to turn on the power source of the electronic apparatus 20a included in the electronic apparatus group 22a, from a terminal device operated by, for example, the operator using the information processing system 100 ((a) of FIG. 2). Based on the instruction to turn on the power source of the electronic apparatus 20a, the power source controller 14 of the management device 10 refers to the holding unit 16 and instructs the turn-on of the power source to all of the electronic apparatuses 20a, 20b, and 20c included in the electronic apparatus group 22a to which the electronic apparatus 20a belongs.

The power source controller 14 causes the holding unit 18 to hold the power source information "→ON" indicating that the power sources are being transitioned from the turn-off state to the turn-on state, until the turn-on of the power sources of the electronic apparatuses 20a, 20b, and 20c is completed ((b) of FIG. 2). The respective electronic apparatuses 20a, 20b, and 20c may notify the management device 10 of whether the turn-on of the power sources of the electronic apparatuses 20a, 20b, and 20c has been completed, or the management device 10 may monitor the state of the power source of each of the electronic apparatuses 20a, 20b, and 20c.

During the transition of the power sources of the electronic apparatuses 20a, 20b, and 20c, the management device 10 receives an instruction to add the electronic apparatus 20d to the electronic apparatus group 22a from the terminal device ((c) of FIG. 2). In the electronic apparatus group 22a, the turn-on of the power sources of the electronic apparatuses 20a and 20b is completed, the power source of the electronic apparatus 20c is being transitioned ((d) of FIG. 2). The allocation controller 12 of the management device 10 refers to the holding unit 18, and suppresses the apparatus information of the electronic apparatus 20d from being stored in the holding unit 16 because the electronic apparatus 20c included in the electronic apparatus group 22a to which the power source of the electronic apparatus 20d is to be added is being transitioned ((e) and (f) of FIG. 2).

Next, after the turn-on of the power source of the electronic apparatus 20c is completed, the power source controller 14 stores the power source information "ON" indicating the turn-on state of the power source in the area of the holding unit 18 which corresponds to the electronic apparatus 20c ((g) and (h) of FIG. 2). By referring to the holding unit 18, the allocation controller 12 detects that the process of interlocking the turn-on of the power sources of all the electronic apparatuses 20a, 20b, and 20c included in the electronic apparatus group 22a has been completed, and then, stores the apparatus information of the electronic apparatus 20d in the holding unit 16 ((i) of FIG. 2). That is, the electronic apparatus 20d is added to the electronic apparatus group 22a ((j) of FIG. 2).

In addition, the allocation controller 12 notifies the power source controller 14 of the information of the holding unit 16 to which the apparatus information of the electronic apparatus 20d has been added. Based on the notification from the allocation controller 12, the power source controller 14 secures an area for storing the state of the power source of the electronic apparatus 20d in the holding unit 18, and stores the turn-off state "OFF" which is the current state of the power source of the electronic apparatus 20d, in the secured area ((k) of FIG. 2).

Next, by referring to the holding unit 18, the allocation controller 12 detects that the states of the power sources of the electronic apparatuses 20a, 20b, and 20c ("ON") do not match the state of the power source of the newly added electronic apparatus 20d ("OFF"), in the electronic apparatus group 22a. Thus, the allocation controller 12 issues an instruction to the power source controller 14 to match the state of the power source of the electronic apparatus 20d with the states of the power sources of the electronic apparatuses 20a, 20b, and 20c.

In addition, as illustrated in (k) of FIG. 2, the management device 10 stores the apparatus information of the electronic apparatus 20d in the holding unit 16, after the transition of the power sources of all the electronic apparatuses 20a, 20b, and 20c included in the electronic apparatus group 22a is completed and reflected in the holding unit 18. As a result, the allocation controller 12 may compare the state of the power source of the electronic apparatus 20d with the state of the power source of any one of the electronic apparatuses 20*a*, 20*b*, and 20*c*, so as to detect whether the states of the power sources match each other.

Based on the instruction from the allocation controller 12, the power source controller 14 instructs the turn-on of the power source to the electronic apparatus 20*d*. Then, the power source controller 14 stores the power source information "→ON" indicating that the power source is being turned on, in the area corresponding to the electronic apparatus 20*d* in the holding unit 18 ((l) of FIG. 2).

Thereafter, when the turn-on of the power source of the electronic apparatus 20*d* is completed, the power source controller 14 stores the power source information "ON" indicating the turn-on state of the power source, in the area corresponding to the electronic apparatus 20*d* in the holding unit 18 ((m) of FIG. 2). Then, the process of adding the electronic apparatus 20*d* to the electronic apparatus group 22*a* is completed. In the operation illustrated in FIG. 2, based on the instruction to add the electronic apparatus 20*d* from the terminal device, the management device 10 adds the electronic apparatus 20*d* to the electronic apparatus group 22*a* and performs a control to match the states of the power sources with each other. That is, without increasing the burden to the operator who operates the terminal device, the electronic apparatus 20*d* may be added to the electronic apparatus group 22*a* by the management device 10.

In addition, an operation which is performed in a case where the instruction to add a new electronic apparatus 20 to the electronic apparatus group 22*a* is received when the power sources of all the electronic apparatuses 20 included in the electronic apparatus group 22*a* are not being transitioned is the same as the operation performed after (i) of FIG. 2. The operation performed after (i) of FIG. 2 represents an operation which is performed in a case where the instruction to add a new electronic apparatus 20 to the electronic apparatus group 22*a* is received when the power sources of all the electronic apparatuses 20 included in the electronic apparatus 22*a* are in the turn-on state ("ON"). An operation which is performed in a case where the instruction to add a new electronic apparatus 20 to the electronic apparatus group 22*a* is received when the power sources of all the electronic apparatuses 20 included in the electronic apparatus group 22*a* are in the turn-off state ("OFF") is the same as the operation performed at the timing of (i), (j), and (k) of FIG. 2. In this case, the power sources of the electronic apparatuses 20*a*, 20*b*, and 20*c* are set to the turn-off state ("OFF").

Figure 3:
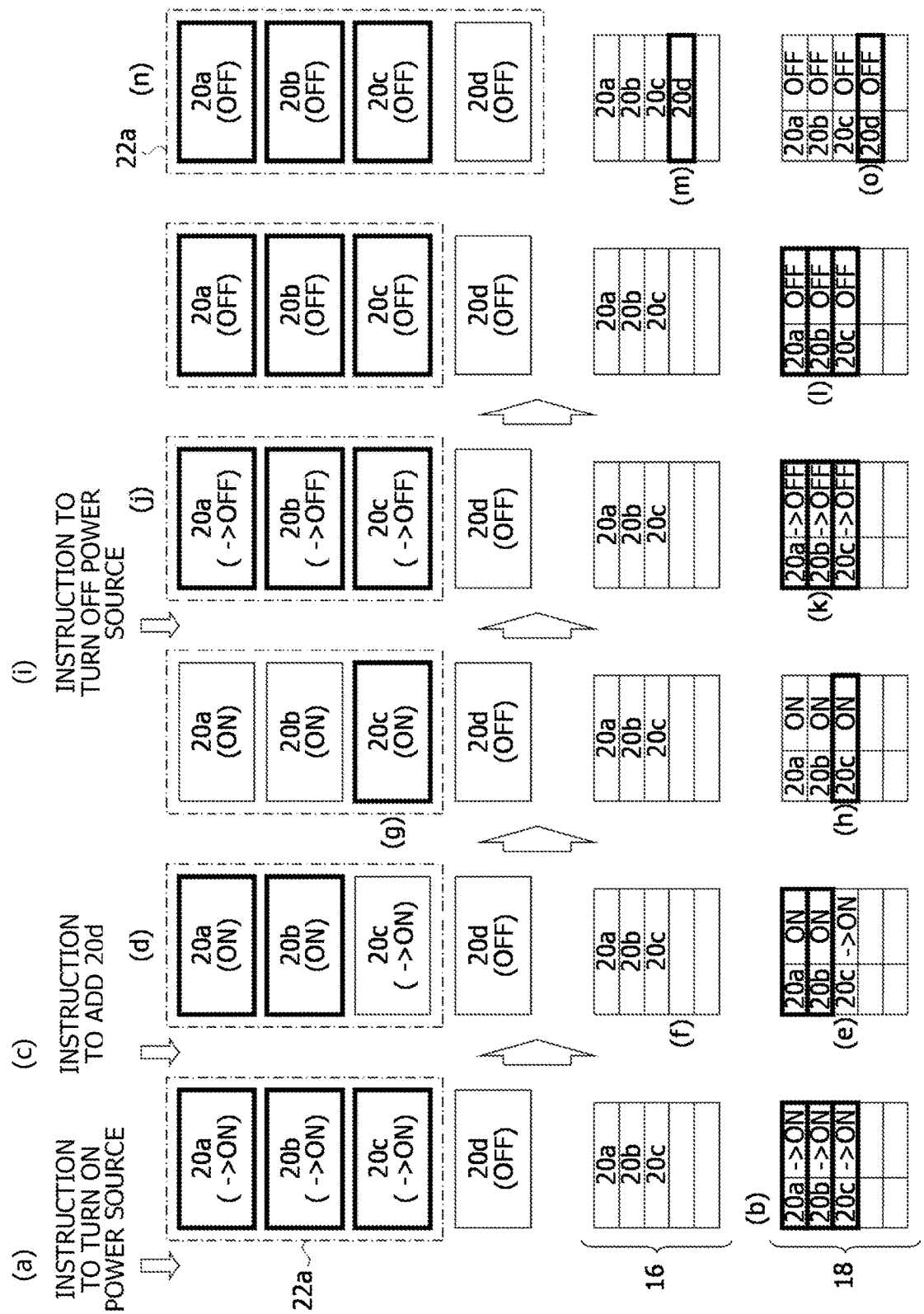
FIG. 3 is a diagram illustrating another example of the operation of the information processing system illustrated in FIG. 1.

FIG. 3 illustrates another example of the operation of the information processing system 100 illustrated in FIG. 1. Detailed descriptions of the operation which is the same or similar to those in FIG. 2 will be omitted. The operations from the reference numerals (a) to (h) illustrated in FIG. 3 are the same as the operations from the reference numerals (a) to (h) illustrated in FIG. 2.

In FIG. 3, after receiving the instruction to add the electronic apparatus 20*d* to the electronic apparatus group 22*a*, the management device 10 receives an instruction to turn off the power source of the electronic apparatus 20*a* before the electronic apparatus 20*d* is added to the electronic apparatus group 22*a* ((i) of FIG. 3). Based on the instruction to turn off the power source of the electronic apparatus 20*a*, the power controller 14 of the management device 10 instructs the turn-off of the power source to all of the electronic apparatuses 20*a*, 20*b*, and 20*c* included in the electronic apparatus group 22*a* to which the electronic apparatus 20*a* belongs.

Based on the instruction to turn off the power source, each of the electronic apparatuses 20*a*, 20*b*, and 20*c* starts the process of turning off the power source ((j) of FIG. 3). The power source controller 14 causes the power source information "→OFF" to be held in the area corresponding to each of the electronic apparatuses 20*a*, 20*b*, and 20*c* in the holding unit 18, until the turn-off of the power source of each of the electronic apparatuses 20*a*, 20*b*, and 20*c* is completed ((k) of FIG. 3).

Thereafter, each time the power source controller 14 detects the turn-off of the power source of each of the electronic apparatuses 20*a*, 20*b*, and 20*c*, the power source controller 14 stores the power source information "OFF" indicating the turn-off state of the power source in the area corresponding to each of the electronic apparatuses 20*a*, 20*b*, and 20*c* in the holding unit 18 ((l) of FIG. 3).

Next, the allocation controller 12 refers to the holding unit 18, and stores the apparatus information of the electronic apparatus 20*d* in the holding unit 16 based on the detection that the process of interlocking the turn-off of the power sources of the electronic apparatuses 20*a*, 20*b*, and 20*c* included in the electronic apparatus group 22*a* has been completed ((m) of FIG. 3). That is, the electronic apparatus 20*d* is added to the electronic apparatus group 22*a* ((n) of FIG. 3).

In addition, the allocation controller 12 notifies the power source controller 14 of the information of the holding unit 16 to which the apparatus information of the electronic apparatus 20*d* has been added. Based on the notification from the allocation controller 12, the power source controller 14 secures an area for storing the state of the power source of the electronic apparatus 20*d* in the holding unit 18, and stores the turn-off state "OFF" which is the current power source state of the electronic apparatus 20*d*, in the secured area ((o) of FIG. 3).

Next, by referring to the holding unit 18, the allocation controller 12 detects that the state of the power source of the newly added electronic apparatus 20*d* ("OFF") matches the states of the power sources of the electronic apparatuses 20*a*, 20*b*, and 20*c* ("OFF") in the electronic apparatus group 22*a*. Then, the process of adding the electronic apparatus 20*d* to the electronic apparatus group 22*a* is completed. Accordingly, even when the instruction to turn off the power source is received while the process of adding the electronic apparatus 20*d* to the electronic apparatus group 22*a* is being performed, the states of the power sources of all the electronic apparatuses 20*a*, 20*b*, 20*c*, and 20*d* included in the electronic apparatus group 22*a* may be matched with each other.

In the embodiment illustrated in FIGS. 1 to 3, even when the instruction to add an electronic apparatus 20 to the electronic apparatus group 22 is received during the transition of the power sources of the electronic apparatuses 20 included in the electronic apparatus group 22, the management device 10 may wait for the completion of the transition of the power sources, and then, add the electronic apparatus 20. That is, the management device 10 may perform the process of adding an electronic apparatus 20 to the electronic apparatus group 22, regardless of the timing when the instruction to add an electronic apparatus 20 to the electronic apparatus group 22 is generated. At this time, the management device 10 may match the states of the power sources of the electronic apparatuses 20 included in the electronic apparatus group 22 with each other, without receiving an instruction to change the states of the power sources from the operator using the information processing system 100. In other words, based on the instruction received during the transition of the power sources of the electronic apparatuses 20 included in the electronic apparatus group 22, an electronic apparatus 20 may be added to the electronic apparatus group 22, and the states of the power sources of the electronic apparatuses 20 included in the electronic apparatus group 22 may be matched with each other.

Regardless of whether the power sources of the electronic apparatuses 20 included in the electronic apparatus group 22 are being transitioned, the operator may issue the instruction to add an electronic apparatus 20 to the electronic apparatus group 22, to the information processing system 100. Since the instruction to add an electronic apparatus 20 to the electronic apparatus group 22 can be issued to the information processing system at an arbitrary timing, the burden to the operator may be reduced, as compared with the related art. For example, when an electronic apparatus 20 is added to the electronic apparatus group 22, the operator may not detect the states of the power sources of the other electronic apparatuses 20 included in the electronic apparatus group 22a.

In addition, since the process of adding an electronic apparatus 20 to the electronic apparatus group 22 is automatically performed by the management device 10, the burden to the operator may be suppressed from being increased, even when the number of electronic apparatuses 20 to be subjected to the interlocking of the transition of the power sources increases.

Figure 4:
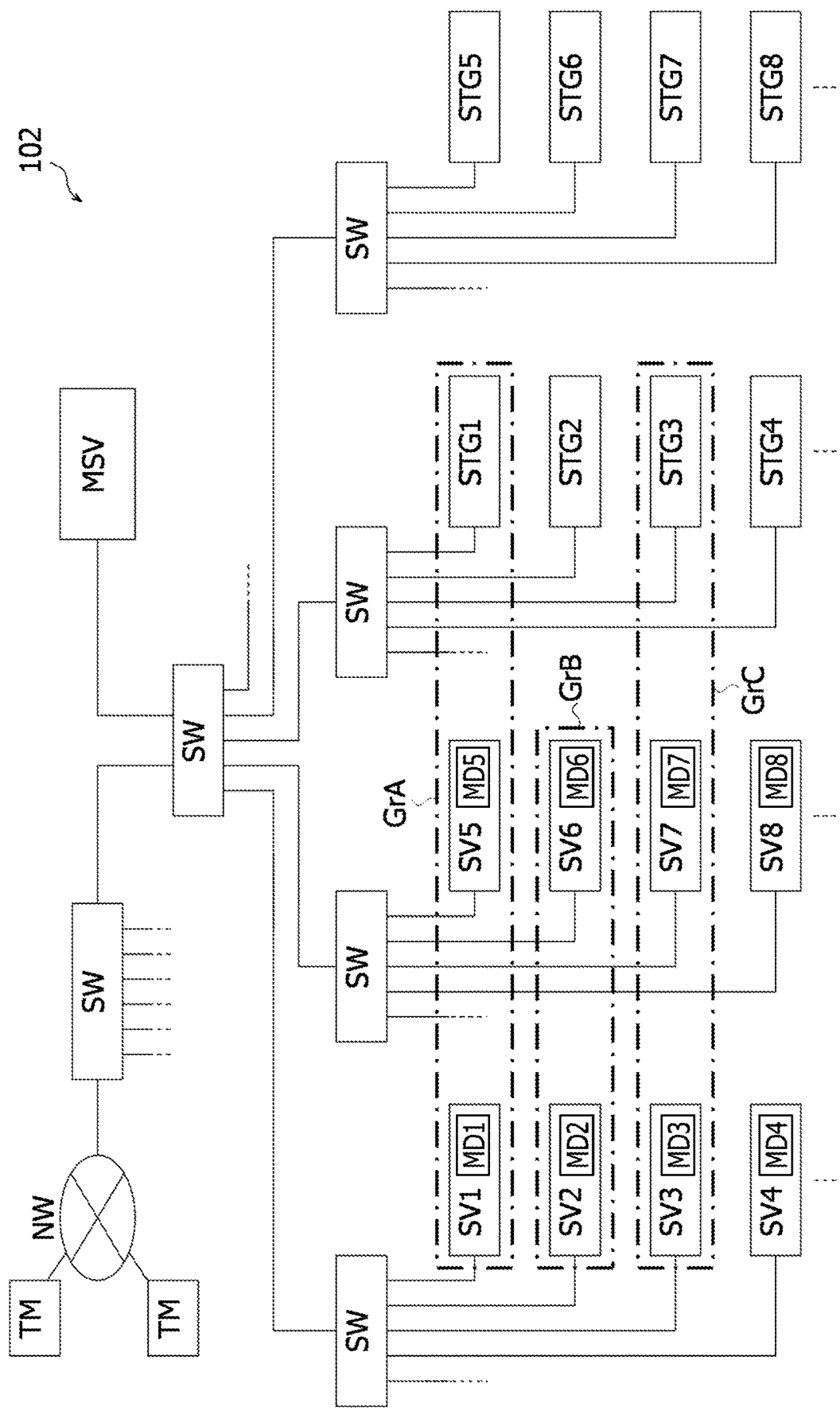
FIG. 4 is a diagram illustrating another example of the configuration of the information processing system.
Figure 5:
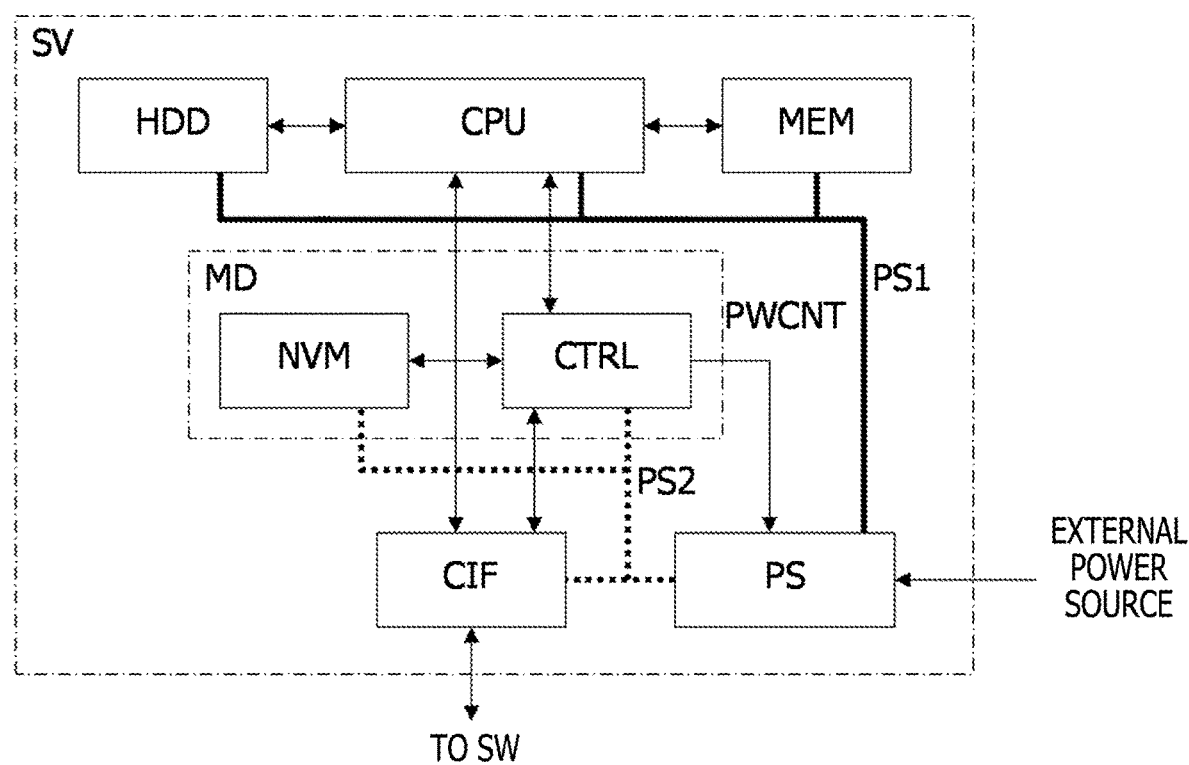
FIG. 5 is a diagram illustrating an example of a server illustrated in FIG. 4.

FIG. 4 illustrates another example of the configuration of the information processing system. Detailed descriptions of the elements which are similar to those illustrated in FIG. 1 will be omitted. As illustrated in FIG. 4, an information processing system 102 includes multiple servers SV (SV1, SV2, . . . ), multiple storages STG (STG1, STG 2, . . . ), and a management server MSV. Each server SV is an example of an information processing apparatus. An example of the server SV is illustrated in FIG. 5. Each storage STG includes a storage device such as an HDD (hard disk drive) or an SSD (solid state drive), and stores, for example, a program executed by the server SV and data processed by the server SV. In the following descriptions, the servers SV and the storages STG are also referred to as nodes. The management server MSV controls the overall operation of the information processing system 102.

The information processing system 102 further includes multiple network switches SW that connect the servers SV, the storages STG, the management server MSV, and a network NW such as the Internet or Intranet to each other. The network switches SW are arranged on a network such as a LAN (local area network). The information processing system 102 is connected to multiple terminal devices TM via the network NW. In addition, the information processing system 102 may be connected to the multiple terminal devices TM without using the network NW. For example, each terminal device TM is operated by an operator using the information processing system 102.

In FIG. 4, servers SV1 and SV5 and a storage STG1 are allocated to a group GrA, servers SV2 and SV6 are allocated to a group GrB, and servers SV3 and SV7 and a storage STG3 are allocated to a group GrC. Each group Gr (GrA, GrB, or GrC) is a unit in which the turn-on or turn-off of the power source is performed in the interlocking manner, and includes at least one server SV. In addition, the servers SV and the storage STG allocated to each group Gr (GrA, GrB, or GrC) are not limited to the example illustrated in FIG. 4.

The servers SV1 to SV8 and the storages STG1 to STG8 are examples of the electronic apparatuses. Each of the groups GrA, GrB, and GrC is an example of the electronic apparatus group including the electronic apparatuses. The servers SV1 and SV5 and the storage STG1 are examples of first electronic apparatuses included in the group GrA, and the servers SV2 and SV6 are examples of first electronic apparatuses included in the group GrB. In addition, the servers SV3 and SV7 and the storage STG3 are examples of first electronic apparatuses included in the group GrC. In addition, the information processing system 102 may include input/output devices other than the storages STG.

Each server SV performs an information processing based on an instruction from the terminal devices TM. Each server SV includes a management device MD (MD1, MD2, . . . ) that manages the interlocking of the transition of the power source which is either the turn-on or turn-off of the power source. In addition, in each group Gr, only a management device MD of a master node which is one of the servers SV manages the interlocking of the transition of the power source. While the server SV other than the master node does not manage the interlocking of the transition of the power source, the server SV operates the management device MD and manages the interlocking of the transition of the power source when the server SV is designated as a master node.

FIG. 5 illustrates an example of the server SV illustrated in FIG. 4. The server SV includes a rewritable nonvolatile memory NVM such as a CPU (central processing unit), a memory MEM, an HDD, or a flash memory, a system controller CTRL, a communication interface unit CIF, and a power source unit PS.

The CPU performs an information processing by executing the OS (operating system) and an application program stored in the memory MEM. The CPU is an example of an information processing unit that performs an information processing. The memory MEM is, for example, a memory module including multiple storage devices such as SDRAMs (synchronous dynamic random access memories), and is connected to the CPU via a memory bus. The HDD stores, for example, the OS and the application programs transmitted to the memory MEM.

The system controller CTRL executes a control program (firmware) held in the nonvolatile memory NVM, so as to manage operations of, for example, the CPU, the memory MEM, the power source unit PS, and a fan (not illustrated). Further, the system controller CTRL functions as the management device MD, so as to manage the interlocking of the transition of the power sources of the multiple nodes included in each group Gr illustrated in FIG. 4. The function of the management device MD is implemented by the system controller CTRL and the nonvolatile memory NVM. In addition, the system controller CTRL has, for example, the function of an XSCF (extended system control facility). By providing the management device MD in each server SV, even when any server SV is allocated to the group Gr, the interlocking of the transition of the power sources of the nodes included in the group Gr may be managed by the management device MD of any one of the servers SV.

For example, the system controller CTRL outputs a power source control signal PWCNT to the power source unit PS that receives an external power source, and controls the supply of the power source from the power source unit PS to, for example, the CPU, the HDD, and the memory MEM. In FIG. 5, a power source PS1 (i.e., a power source voltage) is supplied to the power source line indicated by a thick solid line from the power source unit PS. The power source unit PS has a function to supply or stop the power source PS1 based on the control by the system controller CTRL. A power source PS2 (i.e., a power source voltage) is constantly supplied to the power source line indicated by a thick dashed line from the power source unit PS. That is, while the external power source is supplied to the power supply unit PS, the power source PS2 is supplied to the system controller CTRL, the nonvolatile memory NVM, and the communication interface unit CIF, regardless of the power control signal PWCNT.

The communication interface unit CIF controls a communication with the terminal device TM, the management server MSV, another server SV, and a storage STG which are connected via the network switch SW. For example, an instruction to transition (turn on or turn off) the power sources to the other servers SV and storage STG, and an instruction to monitor the states of the power sources of the other servers SV and storage STG are performed using an intelligent platform management interface (IPMI). In addition, the management server MSV illustrated in FIG. 4 also has the configuration similar to that illustrated in FIG. 5.

Figure 6:
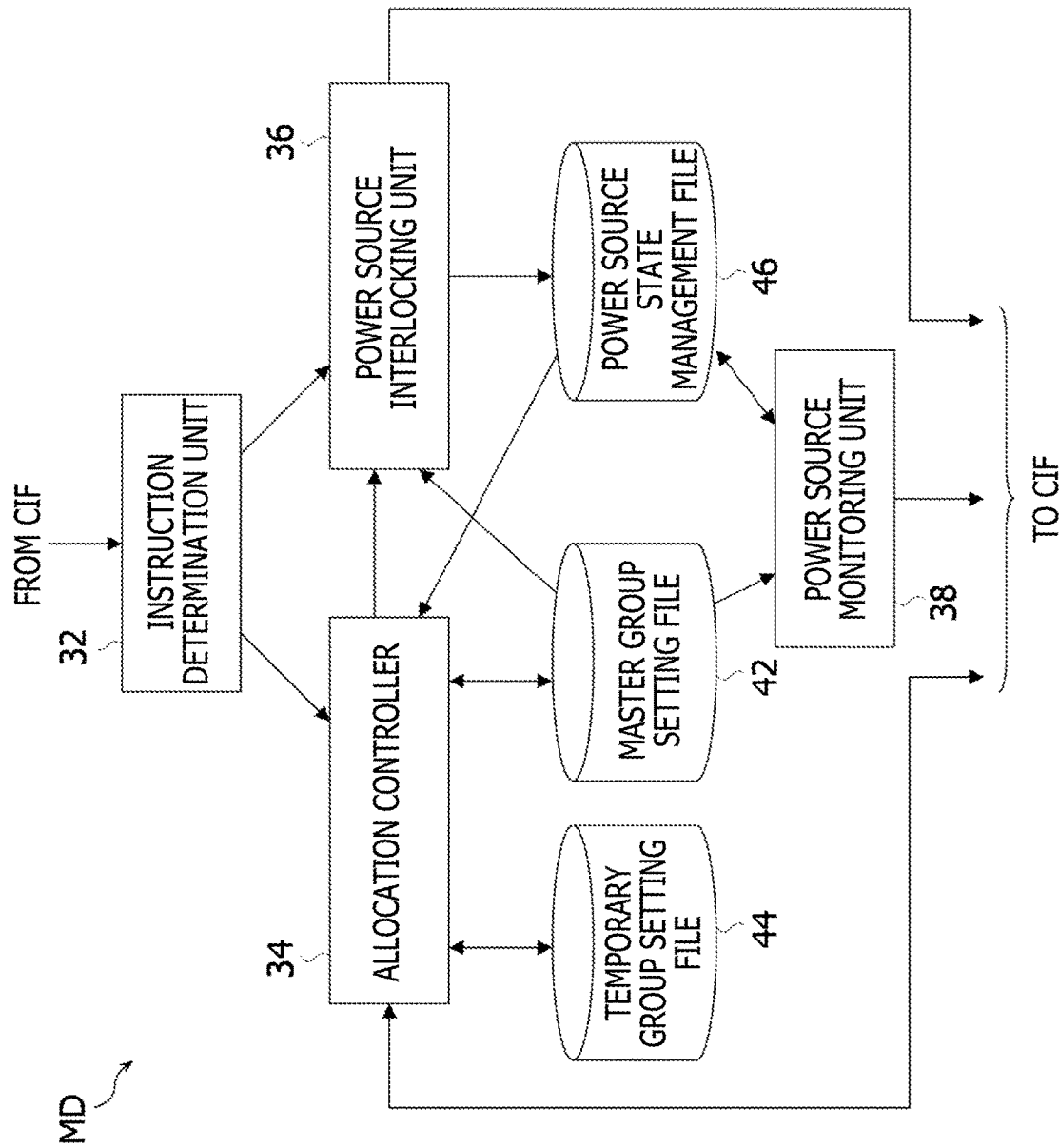
FIG. 6 is a diagram illustrating an example of a function of a management device included in a server operating as a master node in each group illustrated in FIG. 4.

FIG. 6 illustrates an example of a function of the management device MD of the server SV that operates as a master node in each group Gr illustrated in FIG. 4. For example, in each group Gr, the server SV that receives the instruction to change the allocation of the group Gr or the instruction to transition the power sources of the nodes included in the group Gr from the terminal device TM via the communication interface unit CIF operates as a master node. In addition, as described with reference to FIG. 4, while each server SV has the function of the management device MD illustrated in FIG. 6, the servers SV other than the master node stop the function of the management device MD.

For example, the terminal device TM transfers the instruction to transition the power sources to any one of the servers SV included in the group Gr to be subjected to the interlocking of the transition of the power sources. In this case, the server SV that receives the instruction via the communication interface unit CIF operates as a master node, and performs a control to turn on the power sources of the nodes in the interlocking manner, or performs a control to turn off the power sources of the nodes in the group Gr in the interlocking manner.

In addition, the terminal device TM transfers an instruction to change the allocation of the nodes included in a group Gr to one of the servers SV included in any one of the multiple groups Gr. For example, the terminal device TM transfers the allocation of the nodes of all the groups Gr including the group Gr which is not to be subjected to the allocation of the nodes. In this case, the server SV that receives the instruction from the terminal device TM operates as a master node in its own group Gr, and performs a control to add a node to the own group Gr or delete a node included in the own group Gr.

In addition, the server SV that has received the instruction to change the allocation of the nodes from the terminal device TM transfers the instruction to change the allocation of the nodes to any one of the servers SV of all the other groups Gr. The server SV that receives the instruction to change the allocation of the nodes from the server SV of another groups Gr operates as a master node in its own group Gr, and performs a control to add a node to the own group Gr or delete a node included in the own group Gr. In addition, the terminal device TM may transfer the instruction to change the allocation of the nodes included in the group Gr to one of the servers SV of the group Gr for each group Gr which is to be subjected to the change of the allocation. In this case, the server SV that receives the instruction from the terminal device TM operates as a master node in its own group Gr, and performs a control to add a node to the own group Gr or delete a node included in the own group Gr.

The management device MD includes an instruction determination unit 32, an allocation controller 34, a power source interlocking unit 36, a power source monitoring unit 38, a master group setting file 42, a temporary group setting file 44, and a power source state management file 46. The power source interlocking unit 36 and the power source monitoring unit 38 are examples of a power source controller. The instruction determination unit 32, the allocation controller 34, the power source interlocking unit 36, and the power source monitoring unit 38 may be implemented by hardware of the system controller CTRL or may be implemented by a control program executed by the system controller CTRL.

The master group setting file 42, the temporary group setting file 44, and the power source state management file 46 are allocated to a nonvolatile memory NVM (FIG. 5) or a built-in RAM (random access memory) (not illustrated) of the system controller CTRL. Examples of the master group setting file 42, the temporary group setting file 44, and the power source state management file 46 are illustrated in FIG. 7.

The instruction determination unit 32 determines the contents of an instruction received from the terminal device TM or another master node via the communication interface unit CIF. When receiving the instruction to change the allocation of the nodes in at least one of the multiple groups Gr, the instruction determination unit 32 outputs the received instruction to the allocation controller 34. When receiving the instruction to interlock the turn-on or turn-off of the power sources of the nodes included in the own group Gr, the instruction determination unit 32 outputs the received instruction to the power source interlocking unit 36.

Based on the instruction received from the instruction determination unit 32, the allocation controller 34 performs the following process in order to change the allocation of the nodes. The allocation controller 34 stores the information indicating the allocation of the nodes included in the received instruction, in the temporary group setting file 44. When the instruction to change the allocation of the nodes is transferred from the terminal device TM, the allocation controller 34 transfers the received instruction to one of the servers SV of the other groups Gr (i.e., a master node).

When the instruction to change the allocation of the nodes in the own group Gr is received, the allocation controller 34 refers to the power source state management file 46, and detects the states of the power sources of the nodes included in the own group Gr. When the power sources of the nodes included in the own group Gr are not being transitioned, the allocation controller 34 replaces the apparatus information of the own group Gr held by the master group setting file 42 with the apparatus information of the own group Gr held by the temporary group setting file 44.

The allocation controller 34 updates the power source state management file 46 in accordance with the apparatus information of the own group Gr newly held in the master group setting file 42, and outputs the instruction to match the states of the power sources of the nodes in the own group Gr with each other, to the power source interlocking unit 36. In addition, the allocation controller 34 transfers the apparatus information of the own group Gr held by the master group setting file 42 after the replacement, to the master nodes of the other groups Gr. In addition, the allocation controller 34 deletes the apparatus information held in the area corresponding to the own group Gr in the temporary group setting file 44. In addition, the allocation controller transfers an instruction to delete the apparatus information of the own group Gr held in the areas of the temporary group setting files 44 of the other groups Gr, to the master nodes of the other groups Gr.

Meanwhile, when receiving the apparatus information of the temporary group setting files 44 held by the master nodes of the other groups Gr, the allocation controller 34 stores the received apparatus information in the temporary group setting file 44. When receiving the master group setting files 42 of the other groups from the master nodes of the other groups Gr, the allocation controller 34 replaces the apparatus information of the other groups Gr held by the master group setting file 42 with the received apparatus information. In addition, when receiving an instruction to delete the apparatus information held in the temporary group setting file 44 from the other groups Gr, the allocation controller 34 deletes the apparatus information held in the area of the temporary group setting file 44 which corresponds to the instructing group Gr.

In addition, when the server SV which does not belong to any of the groups Gr receives the instruction to change the allocation of the nodes, the server SV that has received the instruction creates a new group Gr. However, hereinafter, descriptions of the creation of a new group will be omitted, and descriptions will be made assuming that a group Gr has already been created.

When receiving the instruction to interlock the turn-on or turn-off of the power sources of the nodes included in the own group Gr from the instruction determination unit 32, the power source interlocking unit 36 stores power source information indicating that the power sources are being transitioned, in the area indicating the state of the power source of the own group Gr held in the power source state management file 46. Further, the power source interlocking unit 36 stores power source information indicating that the power sources are being transitioned, in the areas indicating the states of the power sources of the nodes which are subjected to the transition of the power sources, among the areas indicating the states of the power sources of the respective nodes in the own group held in the power source state management file 46. By referring to the master group setting file 42, the power source interlocking unit 36 detects the nodes which are subjected to the transition of the power sources, and outputs the instruction to transition the states of the power sources to the detected nodes.

In addition, the power source interlocking unit 36 updates the contents of the power source state management file 46 in accordance with the states of the power sources of the respective nodes in the own group Gr. When the states of the power sources of the multiple nodes included in the own group Gr do not match each other, the power source interlocking unit 36 stores power source information indicating that the power sources are being transitioned, in the area indicating the state of the power source of the own group Gr held in the power source state management file 46. Then, the power source interlocking unit 36 performs a control to match the states of the power sources of the nodes included in the own group Gr with each other. For example, the power source interlocking unit 36 performs a control to conform the state of the power source of the node newly added to the own group Gr to the states of the power sources of the other nodes included in the own group Gr. Then, when the states of the power sources of the multiple nodes included in the own group Gr match each other, power source information indicating that the states of the power sources match each other is stored in the area indicating the state of the power source of the own group Gr held in the power source state management file 46.

By referring to the master group setting file 42, the power source monitoring unit 38 detects the nodes included in the own group Gr, and monitors the states of the power sources of the nodes included in the own group Gr. In addition, the power source monitoring unit 38 monitors the states of the power sources of the nodes included in the own group Gr based on the instruction from the power source interlocking unit 36. For example, by referring to the power source state management file 46, the power source monitoring unit 38 detects a node of which power source is being transitioned from the turn-off state to the turn-on state, or a node of which power source is being transitioned from the turn-on state to the turn-off state, among the nodes included in the own group Gr. Then, when the transition of the power source of the detected node is completed, the power source monitoring unit 38 changes the area corresponding to the corresponding node in the power source state management file 46, from the power source information indicating that the power source is being transitioned to the power source information indicating the turn-in state or turn-off state. The power source monitoring unit 38 may detect the state of the power source of each node based on a notification from each node or by a method such as polling.

FIG. 7 illustrates examples of the master group setting file 42, the temporary group setting file 44, and the power state management file 46 which are illustrated in FIG. 6. The apparatus information held by the master group setting file 42 is the same for all the master nodes, and the apparatus information held by the temporary group setting file 44 is the same for all the master nodes. The power source state management file 46 is provided in the master node of each of the groups GrA, GrB, and GrC.

The master group setting file 42 holds apparatus information for identifying the nodes belonging to the group Gr, for each group Gr allocated to the information processing system 102. In FIG. 7, the apparatus information for identifying the nodes is indicated by the reference numerals of the servers SV and the storages STG. The master group setting file 42 illustrated in FIG. 7 represents the states of the groups GrA, GrB, and GrC allocated to the information processing system 102 illustrated in FIG. 4. The master group setting file 42 is an example of a first holding unit.

The temporary group setting file 44 holds apparatus information included in the instruction to change the allocation of the nodes which is received from the terminal device TM, for each group Gr allocated to the information processing system 102. The temporary group setting file 44 is an example of a fourth holding unit. For example, the apparatus information held by the temporary group setting file 44 is transmitted from the terminal device TM illustrated in FIG. 4 to the master node of any one of the groups Gr (GrA, GrB, and GrC).

By providing the temporary group setting file 44 in each master node, the master group setting file 42 may be suppressed from being directly rewritten based on the instruction to change the allocation of the nodes which is received from the terminal device TM. In other words, the apparatus information of the own group Gr held by the master group setting file 42 may be suppressed from being inconsistent with the information of the nodes held by the power source state management file 46, so that the control to transition the power sources of the nodes may be accurately performed. Upon receiving the apparatus information to be held in the temporary group setting file 44, the master node transfers the received apparatus information to the master nodes of the other groups Gr. Thus, the terminal device TM may set the apparatus information in the temporary group setting file 44 of each group Gr without transferring the instruction to change the allocation to each of the multiple groups Gr.

The temporary group setting file 44 illustrated in FIG. 7 indicates that the storage STG1 is deleted from the group GrA and the storage STG1 is added to the group GrC, in the apparatus information held in the master group setting file 42. That is, FIG. 7 represents that the information processing system 102 has received an instruction to move the storage STG1 allocated to the group GrA to the group GrC, from the terminal device TM. In addition, the example of changing the nodes allocated to the group Gr is not limited to FIG. 7. For example, the information processing system 102 may receive the instruction to add and delete a node with respect to one group Gr from the terminal device TM, or may receive the instruction to newly provide or delete a group Gr from the terminal device TM.

The power source state management file 46 has an area for holding a node status NST indicating the state of the power source for each node allocated to a group Gr, and an area for holding a group status GST indicating the state of the power source of a group Gr. The node status NST is an example of first power source information, and the group status GST is an example of second power source information. The area for holding the node status NST is an example of a second holding unit, and the area for holding the group status GST is an example of a third holding unit.

As illustrated in FIG. 7, the node status NST of the power source state management file 46 holds the power source information "ON" indicating that the power sources of the servers SV1 and SV5 and the storage STG1 are in the turn-on state. The group status GST of the power source state management file 46 of the group GrA holds power source information "STDY" indicating that the transition of the power sources of all the nodes (SV1, SV5, and STG 1) in the group GrA has been completed. The node status NST of the power source state management file 46 of the group GrB holds the power source information "ON" indicating that the power sources of the servers SV1 and SV5 are in the turn-on state. The group status GST of the power source state management file 46 of the group GrB holds power source information "STDY" indicating that the transition of the power sources of all the nodes (SV1 and SV6) in the group GrB has been completed.

The node status NST of the power state management file 46 of the group GrC holds the information indicating that the power sources of the servers SV3 and SV7 are in the turn-off state ("OFF"), and the information indicating that the power source of the storage STG3 is being transitioned to the turn-off state ("→OFF"). The group status GST of the power source state management file 46 of the group GrC holds the power source information "TRNS" indicating that the power source of at least one of the nodes (SV3, SV7, and STG3) in the group GrC is being transitioned. That is, when the power source of at least one of the nodes included in the group Gr is being transitioned from the turn-on state to the turn-off state, the group status GST holds the power source information "TRNS."

In addition, the master group setting file 42 and the temporary group setting file 44 may be included in the management device MD of all the servers SV included in the information processing system 102. In this case, the master node that has updated the master group setting file 42 instructs the update of the master group setting file 42 to the management devices MD of all the other servers SV. In addition, the master node that has updated the temporary group setting file 44 instructs the update of the temporary group setting file 44 to the management devices MD of all the other servers SV.

In addition, the master node of each group Gr may have the temporary group setting file 44 and the master group setting file 42 which hold only the apparatus information of the nodes included in the own group Gr. In this case, the terminal device TM (FIG. 4) transfers the instruction to change the allocation of the nodes included in the group Gr to each group Gr which is a target of the change. The group Gr that has received the instruction performs an operation of changing the allocation of the nodes without cooperating with the other groups Gr. In addition, the operation to cooperate the operation of changing the allocation of the nodes with the other groups Gr is illustrated in FIGS. 8 to 11.

FIG. 8 illustrates an example of the operation of the server SV1 of the group GrA in the information processing system 101 illustrated in FIG. 4. That is, FIG. 8 illustrates an example of the method of controlling the information processing system 102. The server SV1 operates as the master node of the group GrA, and the operations illustrated in FIG. 8 are performed by the management device MD of the server SV1. Each thick frame illustrated in FIG. 8 indicates an element of which state has changed from the previous state.

In a state (A), the allocation controller 34 of the management device MD of the server SV1 receives the instruction to change the allocation of the nodes from the terminal device TM (FIG. 4), and stores the apparatus information included in the received instruction in the temporary group setting file 44 ((a) of FIG. 8). Further, the allocation controller 34 transfers the instruction to change the allocation of the nodes that has been received from the terminal device TM, to the master nodes of the other groups GrB and GrC ((b) of FIG. 8).

As a result, the terminal device TM may transfer the instruction to change the allocation of the nodes to the master node of each group Gr without transferring the instruction to each of the multiple groups Gr, so as to store the apparatus information in the temporary group setting file 44. Accordingly, each group Gr may change the allocation of the nodes based on the instruction to change the allocation of the nodes which has been received in any one of the groups Gr. The state (A) illustrated in FIG. 8 is the same as the state of the group GrA illustrated in FIG. 7. The allocation controller 34 refers to the group status GST of the power source state management file 46, and detects that the transition of the power sources of the nodes (SV1, SV5, and STG1) included in the group GrA has been completed ("STDY").

In a state (B), since the transition of the power source of the group GrA has been completed, the allocation controller 34 stores the apparatus information of the group GrA held by the temporary group setting file 44, in the master group setting file 42 ((c) of FIG. 8). That is, the storage STG1 is deleted from the group GrA.

In this way, by referring to the group status GST, the allocation controller 34 may detect that the transition of the power sources of all the nodes included in the group GrA has been completed, and the power sources are in the stable state, without referring to the node status NST of each node. As a result, the time required until the states of the power sources of the group GrA are detected may be reduced, as compared with a case where the node status NST is referred to.

The allocation controller 34 transfers the apparatus information of the group GrA held in the master group setting file 42 to the master nodes of the other groups GrB and GrC ((d) of FIG. 8). Further, the allocation controller 34 updates the power source state management file 46 in accordance with the apparatus information of the group GrA held in the master group setting file 42 ((e) of FIG. 8). In addition, when a node is deleted from the group Gr, the states of the power sources of the nodes in the group after the deletion of the node remain in the same state "STDY."

Next, in a state (C), the allocation controller 34 deletes the apparatus information held in the area corresponding to the group GrA in the temporary group setting file 44 ((f) of FIG. 8). Further, the allocation controller 34 instructs the master nodes of the groups GrB and GrC to delete the apparatus information of the group GrA held in the areas of the temporary group setting files 44 of the groups GrB and GrC ((g) of FIG. 8).

In a state (D), when receiving the apparatus information held in the master group setting file 42 of the master node of the group GrB, the allocation controller 34 replaces the apparatus information of the group GrB held by the master group setting file 42 with the received apparatus information. In addition, when receiving the apparatus information held in the master group setting file 42 of the master node of the group GrC, the allocation controller 34 replaces the apparatus information of the group GrC held by the master group setting file 42 with the received apparatus information ((h) of FIG. 8).

In addition, when receiving the instruction to delete the apparatus information held in the temporary group setting file 44 from the group GrB, the allocation controller 34 deletes the apparatus information held in the area corresponding to the group GrB in the temporary group setting file 44. In addition, when receiving the instruction to delete the apparatus information held in the temporary group setting file 44 from the group GrC, the server SV1 deletes the apparatus information held in the area corresponding to the group GrC in the temporary group setting file 44 ((i) of FIG. 8).

In addition, the operation represented in the state (D) may be performed between the states (A) and (B) or between the states (B) and (C). In addition, when the terminal device TM transfers the instruction to change the allocation of the nodes for each group Gr, the temporary group setting file 44 and the master group setting file 42 hold only the apparatus information of the nodes included in the own group GrA. In this case, the operations illustrated in (b), (d), (g), (h), and (i) of FIG. 8 are not performed.

Figure 9:
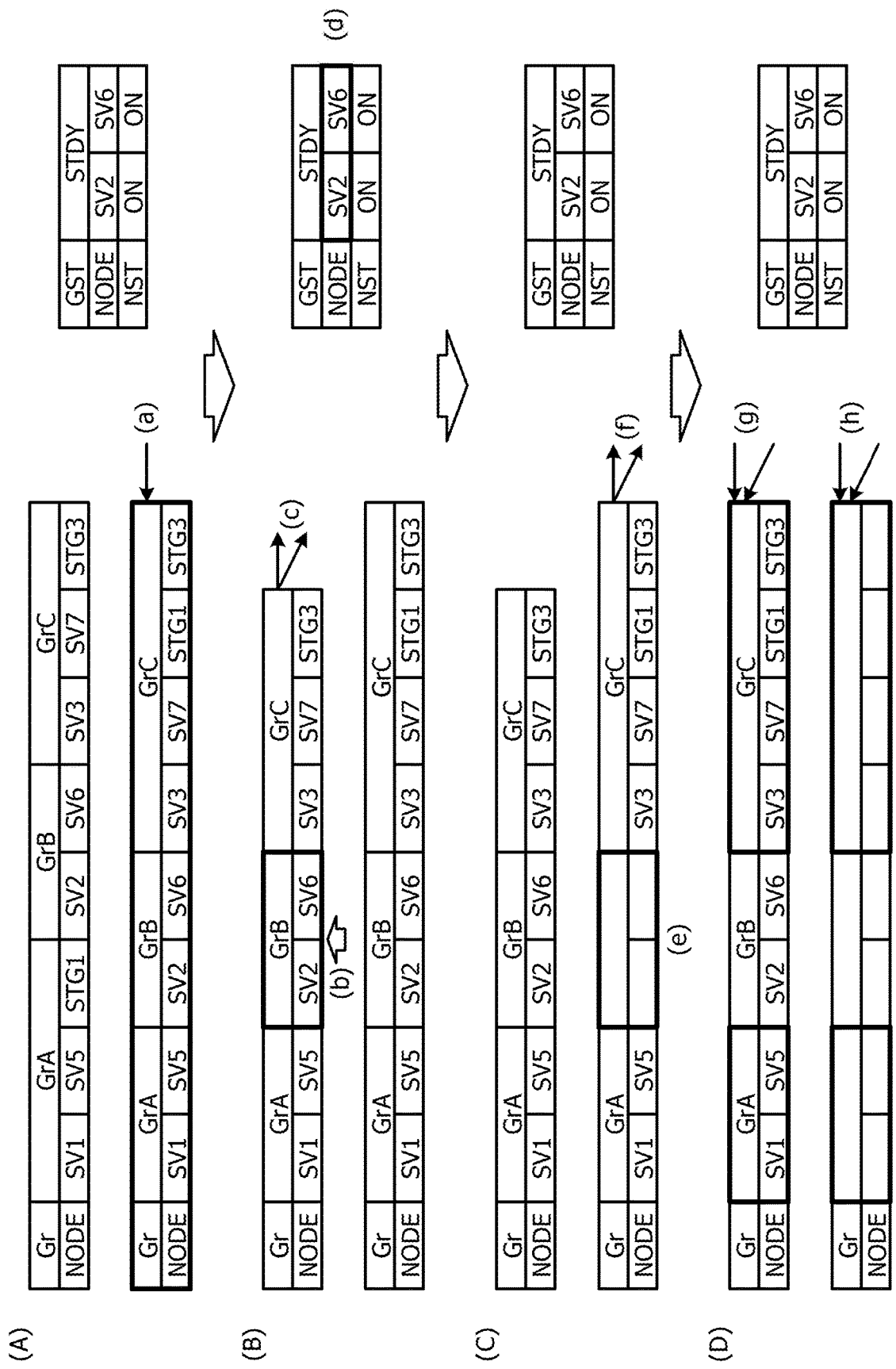
FIG. 9 is a view illustrating an example of an operation of a server SV2 of a group GrB in the information processing system illustrated in FIG. 4.

FIG. 9 illustrates an example of the operation of the server SV2 of the group GrB in the information processing system 2 illustrated in FIG. 4. That is, FIG. 9 illustrates an example of a method of controlling the information processing system 102. The server SV2 operates as the master node of the group GrB, and the operations illustrated in FIG. 9 are performed by the management device MD of the server SV2.

In a state (A), the allocation controller 34 of the management device MD of the server SV2 receives the instruction to change the allocation of the nodes from the server SV1 which is the master node of the group GrA. The allocation controller 34 stores the apparatus information included in the received instruction, in the temporary group setting file 44 of its own node ((a) of FIG. 9). That is, the allocation controller 34 of the group GrB may store the apparatus information in the temporary group setting file 44, without receiving the instruction to change the allocation of the nodes from the terminal device TM. The state (A) illustrated in FIG. 9 is the same as the state of the group GrB illustrated in FIG. 7.

Next, in a state (B), the allocation controller 34 refers to the group status GST of the power source state management file 46, and detects the states of the power sources of the nodes (SV2 and SV6) included in the group GrB. Since the group status GST indicates the completion of the transition of the power sources ("STDY"), the allocation controller 34 stores the apparatus information of the group GrB held by the temporary group setting file 44 in the master group setting file 42 ((b) of FIG. 9). In the example illustrated in FIG. 9, since the apparatus information of the group GrB held by the temporary group setting file 44 is the same as the apparatus information of the group GrB held by the master group setting file 42, the apparatus information held by the master group setting file 42 does not change.

The allocation controller 34 transfers the apparatus information of the group GrB held in the master group setting file 42 to the master nodes of the other groups GrA and GrC ((c) of FIG. 9). Further, the allocation controller 34 updates the power source state management file 46 in accordance with the apparatus information of the group GrB held in the master group setting file 42 ((d) of FIG. 9).

Next, in a state (C), the allocation controller 34 deletes the apparatus information held in the area corresponding to the group GrB in the temporary group setting file 44 ((e) of FIG. 9). Further, the allocation controller 34 instructs the master nodes of the groups GrB and GrC to delete the apparatus information of the group GrB held in the areas of the temporary group setting files 44 of the groups GrB and GrC ((f) of FIG. 9).

In a state (D), when receiving the apparatus information held in the master group setting file 42 of the master node of the group GrA, the allocation controller 34 replaces the apparatus information of the group GrA held by the master group setting file 42 with the received apparatus information. In addition, when receiving the apparatus information held in the master group setting file 42 of the master node of the group GrC, the allocation controller 34 replaces the apparatus information of the group GrC held by the master group setting file 42 with the received apparatus information ((g) of FIG. 9).

When receiving the instruction to delete the apparatus information held in the temporary group setting file 44 from the group GrA, the allocation controller 34 deletes the apparatus information held in the area corresponding to the group GrA in the temporary group setting file 44. In addition, when receiving the instruction to delete the apparatus information held in the temporary group setting file 44 from the group GrC, the server SV1 deletes the apparatus information held in the area corresponding to the group GrC in the temporary group setting file 44 ((h) of FIG. 9).

In addition, the operation represented in the state (D) may be performed between the states (A) and (B) or between the state (B) and (C). In addition, when the terminal device TM transfers the instruction to change the allocation of the nodes for each group Gr, the temporary group setting file 44 and the master group setting file 42 hold only the apparatus information of the nodes included in the own group GrB. In this case, the operation of (a) of FIG. 9 represents an operation of receiving the instruction to change the allocation of the nodes from the terminal device TM, and the operations represented in (c), (f), (g), and (h) of FIG. 9 are not performed.

Figure 10:
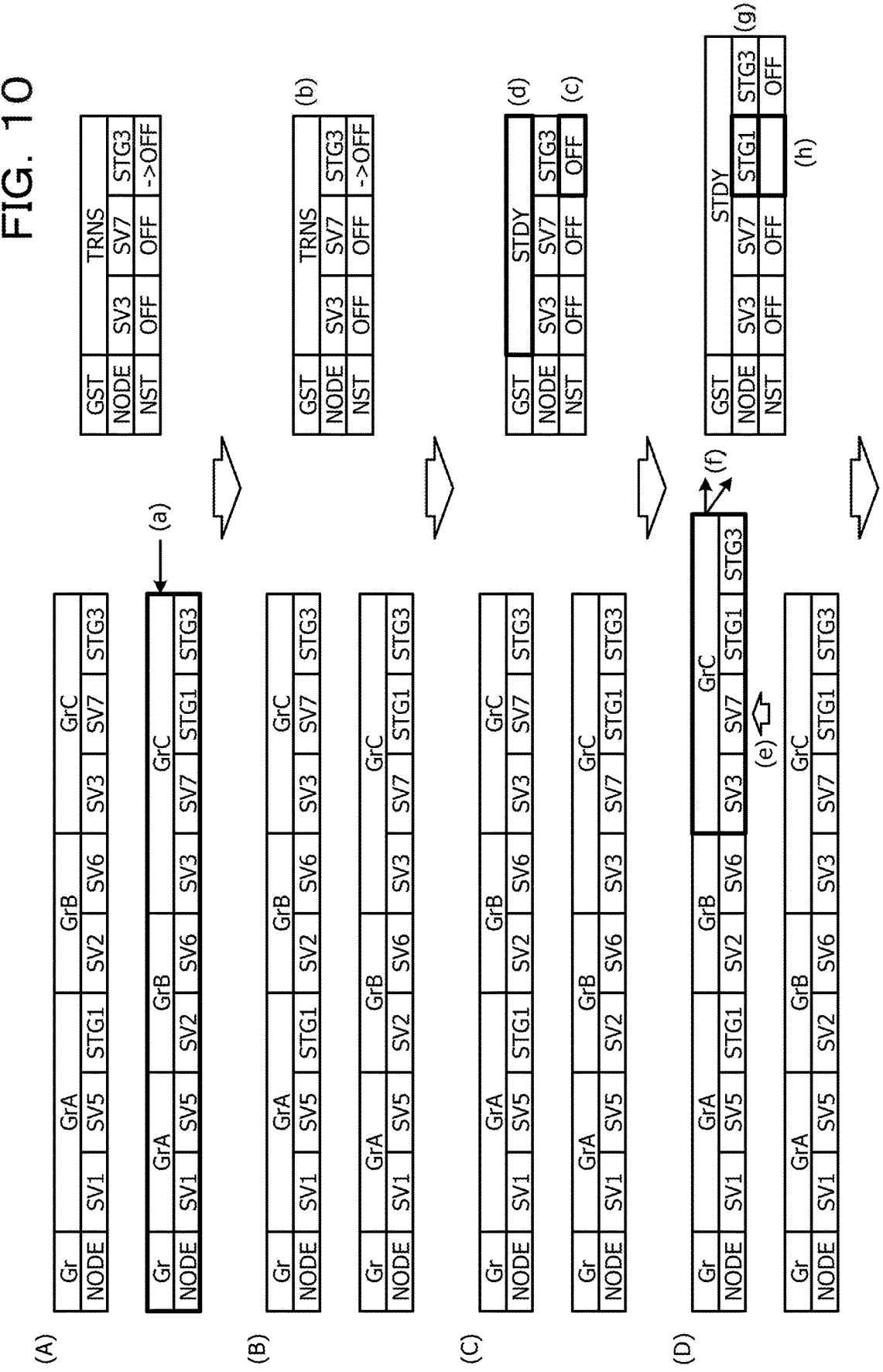
FIG. 10 is a view illustrating an example of an operation of a server SV3 of a group GrC in the information processing system illustrated in FIG. 4.
Figure 11:
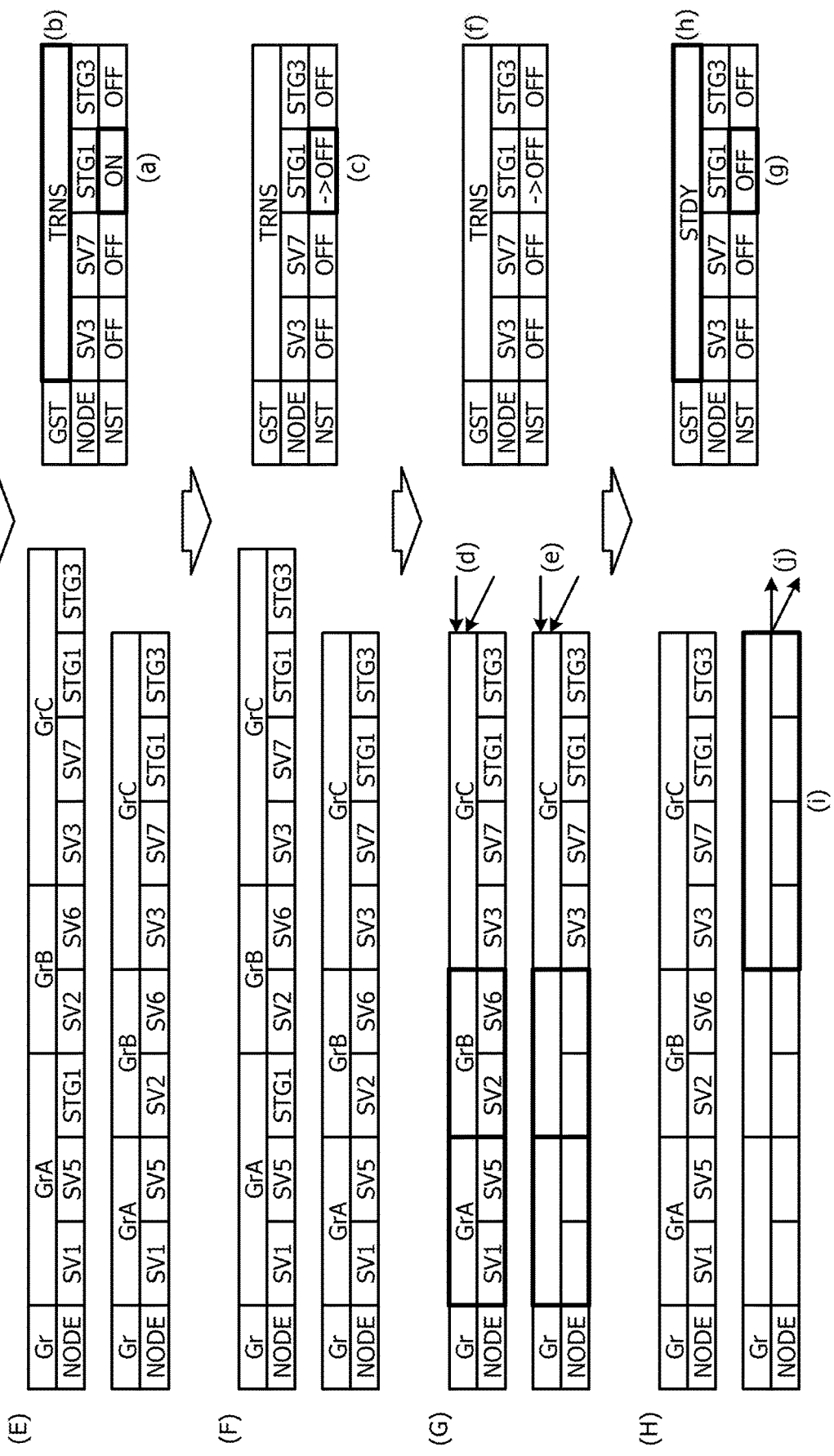
FIG. 11 is a view illustrating the continuation of the operation in FIG. 10.

FIGS. 10 and 11 illustrate an example of the operation of the server SV3 of the group GrC in the information processing system 102 illustrated in FIG. 4. That is, FIGS. 10 and 11 illustrate an example of a method of controlling the information processing system 102. The server SV3 operates as the master node of the group GrC, and the operations illustrated in FIGS. 10 and 11 are performed by the management device MD of the server SV3.

In a state (A), the allocation controller 34 of the management device MD of the server SV3 receives the instruction to change the allocation of the nodes from the server SV1 which is the master node of the group GrA. The allocation controller 34 stores the apparatus information included in the received instruction, in the temporary group setting file 44 of its own node ((a) of FIG. 10). The state (A) illustrated in FIG. 10 is the same as the state of the group GrC illustrated in FIG. 7.

Next, in a state (B), the allocation controller 34 refers to the group status GST of the power source state management file 46, and detects the states of the power sources of the nodes (SV3, SV7, and STG3) included in the group GrC. The group status GST indicates that the power source of any one of the nodes is being transitioned ("TRNS"). Thus, the allocation controller 34 suppresses the process of storing the apparatus information of the group GrC held in the temporary group setting file 44, in the master group setting file 42 ((b) of FIG. 10).

Next, in a state (C), the power source monitoring unit 38 (FIG. 6) of the server SV3 detects that the power source of the storage STG 3 has been transitioned from the turn-on state to the turn-off state. Then, the power source monitoring unit 38 sets the node status NST corresponding to the node STG 3 in the power state management file 46 to the power source information "OFF" ((c) of FIG. 10). The node status NST of the power source state management file 46 indicates the turn-off state of the power sources of all the nodes (SV3, SV7, and STG3) included in the group GrC. Thus, the power source monitoring unit 38 sets the group status GST to the power source information "STDY" indicating the completion of the transition of the power sources ((d) of FIG. 10).

Next, in a state (D), the allocation controller 34 refers to the group status GST of the power source state management file 46, and detects the states of the power sources of the nodes (SV3, SV7, and STG3) included in the group GrC. The group status GST indicates the completion of the transition of the power sources ("STDY"). Thus, the allocation controller 34 replaces the apparatus information of the group GrC held in the master group setting file 42 with the apparatus information of the Group GrC held by the temporary group setting file 44 ((e) of FIG. 10). That is, the storage STG1 is added to the group GrC. By waiting for the completion of the transition of the power sources and updating the apparatus information held by the master group setting file 42, the information of the nodes held by the power source state management file 46 and the apparatus information held by the master group setting file 42 may be matched with each other. As a result, the allocation controller 34 may compare the state of the power source of, for example, the newly added storage STG1 with the state of the power source of any one of the nodes held in the power source state management file 46, so as to detect whether the states of the power sources match each other.

The allocation controller 34 transfers the apparatus information of the group GrC held in the master group setting file 42 to the master nodes of the other groups GrA and GrB ((f) of FIG. 10). Further, the allocation controller 34 adds the information indicating the node STG1 to the power source state management file 46 in accordance with the apparatus information of the group GrC held in the master group setting file 42 ((g) of FIG. 10). For example, when the information indicating the node STG1 is added to the power source state management file 46, the node status NST indicating the state of the power source of the node STG1 is not set and is undetermined ((h) of FIG. 10). Thus, the allocation controller 34 instructs the power source interlocking unit 36 (FIG. 6) to match the state of the power source of the added node STG1 with the states of the power sources of the other nodes in the own group. The power source interlocking unit 36 inquires of the storage STG 1 about the state of the power source based on the instruction from the allocation controller 34.

Next, in a state (E) illustrated in FIG. 11, the power source interlocking unit 36 receives the information indicating the turn-on state of the power source which is output from the storage STG1. Based on the received information, the power source interlocking unit 36 sets the power source information "ON" in the node status NST corresponding to the node STG1 ((a) of FIG. 11). Since both the power source information "ON" and the power source information "OFF" exist in the node status NST, the power source interlocking unit 36 sets the power source information "TRNS" indicating that the power source of at least one of the nodes in the group GrC is being transitioned, in the group status GST ((b) of FIG. 11).

In a state (F), in order to match the state of the power source of the newly added storage STG1 with the states of the power sources of the other nodes in the group GrC, the power source interlocking unit 36 transfers an instruction to turn off the power source to the storage STG1. Then, the power source interlocking unit 36 sets the power source information "→OFF" indicating that the power source is being turned off, in the node status NST corresponding to the node STG1.

In a state (G), when receiving the apparatus information held in the master group setting file 42 of the master node of the group GrA, the allocation controller 34 replaces the apparatus information of the group GrB held by the master group setting file 42 with the received apparatus information. In addition, when receiving the apparatus information held in the master group setting file 42 of the master node of the group GrB, the allocation controller 34 replaces the apparatus information of the group GrB held by the master group setting file 42 with the received apparatus information ((d) of FIG. 11).

When receiving the instruction to delete the apparatus information held in the temporary group setting file 44 from the group GrA, the allocation controller 34 deletes the apparatus information held in the area corresponding to the group GrA in the temporary group setting file 44. In addition, when receiving the instruction to delete the apparatus information held in the temporary group setting file 44 from the group GrB, the allocation controller 34 deletes the apparatus information held in the area corresponding to the group GrB of the temporary group setting file 44 ((e) of FIG. 11). In addition, the operation represented in the state (F) may be performed between the states (A) and (B), between the states (B) and (C), or between the states (C) and (D), which are illustrated in FIG. 10, or between the state (D) illustrated in FIG. 10 and the state (A) illustrated in FIG. 11. Alternatively, the operation represented in the state (F) may be performed after the operation represented in the state (G).

The allocation controller 34 refers to the group status GST of the power source state management file 46, and detects the states of the power sources of the nodes (SV3, SV7, STG1, and STG3) included in the group GrC. Since the group status GST indicates that the power source of one of the nodes is being transitioned ("TRNS"), the allocation controller 34 suppresses the process of deleting the apparatus information of the group GrC held by the temporary group setting file 44 ((f) of FIG. 11).

In a state (G), the power source monitoring unit 38 (FIG. 6) detects that the power source of the storage STG1 has been transitioned from the turn-on state to the turn-off state, and sets the node status NST corresponding to the node STG1 in the power state management file 46 to "OFF" ((g) of FIG. 11). In addition, the power source monitoring unit 38 detects that the node status NST of the power source state management file 46 indicates the turn-off state for the power sources of all the nodes (SV3, SV7, STG1, and STG3) included in the group GrC. Then, the power source monitoring unit 38 sets the group status GST to the power source information "STDY" indicating the completion of the transition of the power sources ((h) of FIG. 11).

Next, since the group status GST of the power source state management file 46 indicates the completion of the transition of the power sources, the allocation controller 34 deletes the apparatus information held in the area corresponding to the group GrC in the temporary group setting file 44 ((i) of FIG. 11). In addition, the allocation controller 34 instructs the master nodes of the groups GrA and GrB to delete the apparatus information of the group GrC held in the areas of the temporary group setting files 44 of the groups GrA and GrB ((j) of FIG. 11).

In addition, when the terminal device TM transfers the instruction to change the allocation of the nodes for each group Gr, the temporary group setting file 44 and the master group setting file 42 hold only the apparatus information of the nodes included in the own group GrC. In this case, the operation of (a) of FIG. 10 represents an operation of receiving the instruction to change the allocation of the nodes from the terminal device TM, and the operations represented in (f) of FIG. 10, and (d), (e), and (j) of FIG. 11 are not performed.

Figure 12:
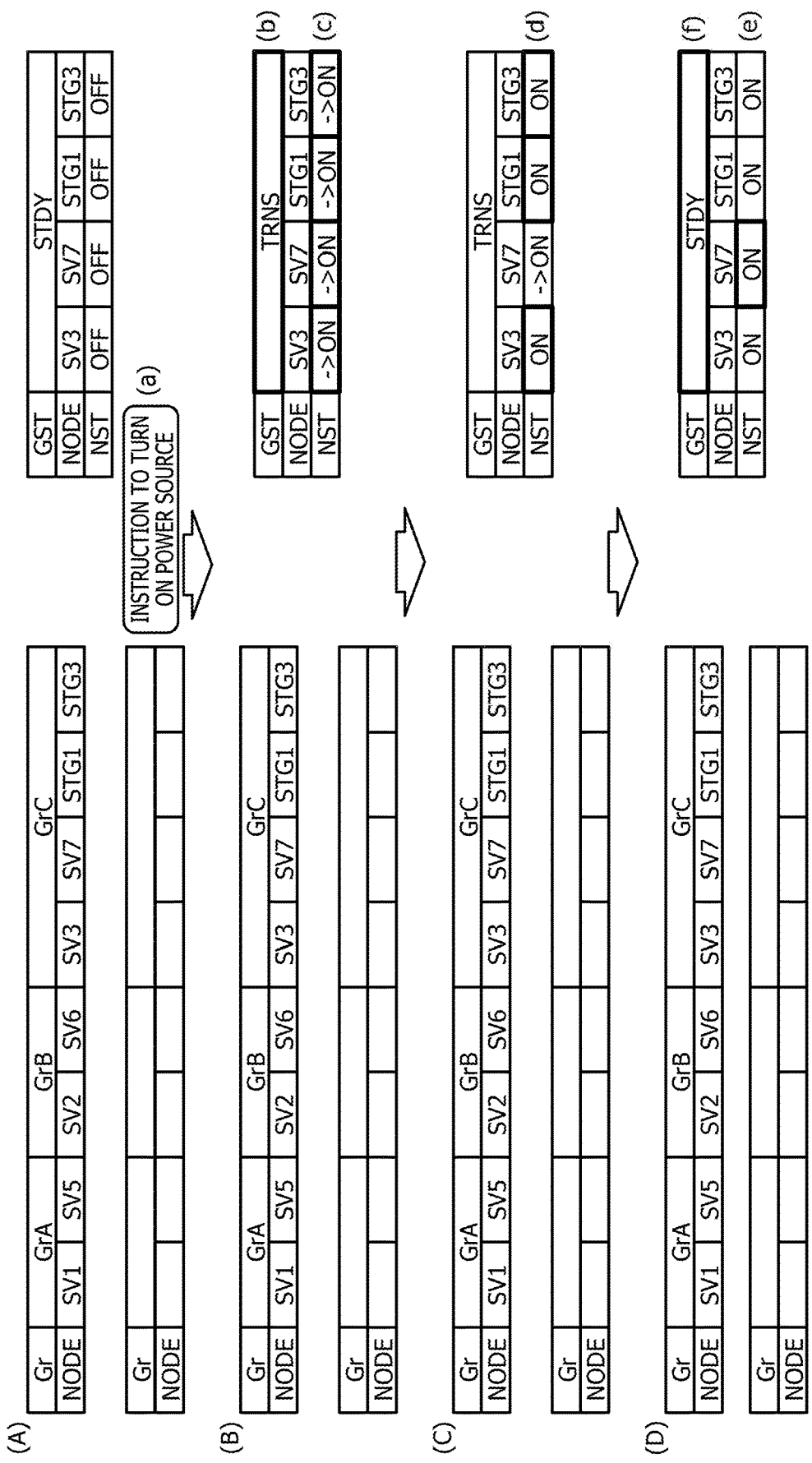
FIG. 12 is a view illustrating another example of the operation of the server SV3 of the group GrC in the information processing system illustrated in FIG. 4.

FIG. 12 illustrates another example of the operation of the server SV3 of the group GrC in the information processing system illustrated in FIG. 4. That is, FIG. 12 illustrates an example of a method of controlling the information processing system 102. A state (A) illustrated in FIG. 12 is the same as the state (H) illustrated in FIG. 11, and the power sources of all the nodes (SV3, SV7, STG1, and STG 3) belonging to the group GrC are turned off.

In the state (A), the management device MD of the server SV3 receives an instruction to turn on the power sources of all the nodes belonging to the group GrC in the interlocking manner, from the terminal device (FIG. 4) ((a) of FIG. 12).

In a state (B), the power source interlocking unit 36 of the server SV3 sets the group status GST of the power source state management file 46 to the power source information "TRNS" indicating that the power sources of the nodes in the group Gr are being transitioned ((b) of FIG. 12). Further, the power source interlocking unit 36 sets the node status NST indicating the turn-off state ("OFF") of the power sources to the power source information "→ON" indicating that the power sources are being transitioned, in the power source state management file 46 ((c) of FIG. 12). In FIG. 12, the power source information "→ON" is stored in all of the node statuses NST. Then, the power source interlocking unit 36 instructs the turn-on of the power source to the nodes of which the node statuses NST have been set to the power source information "→ON." Further, the power source interlocking unit 36 outputs an instruction to the power source monitoring unit 38 to monitor the nodes until the states of the power sources of the nodes that have been instructed to turn on the power source reach an expected value (become the turn-on state, in the present example).

In a state (C), the power source monitoring unit 38 inquires of the nodes to which the instruction to monitor the power sources has been made, about the states of the power sources. In the example illustrated in FIG. 12, a response indicating the turn-on state ("ON") of the power sources is received from the server SV3 and the storages STG1 and STG3, and a response indicating the turn-off state ("OFF") of the power source is received from the server SV7. In the node status NST, the power source monitoring unit 38 stores the power source information "ON" in the areas corresponding to the server SV3 and the storages STG 1 and STG 3 which are the transmission sources of the response indicating the turn-on state ("ON") ((d) of FIG. 12).

In a state (D), the power source monitoring unit 38 inquires the server SV7 of which the power source state is not in the turn-on state which is the expected value, about the state of the power source. The power source monitoring unit 38 receives a response indicating the turn-on state of the power source from the server SV7, and stores the power source information "ON" in the area corresponding to the server SV7 in the node status NST ((e) of FIG. 12). When the node statuses NST corresponding to all of the nodes in the group GrC hold the same power source information "ON," the power source monitoring unit 38 stores the power source information "STDY" indicating the completion of the transition of the power sources in the group status GST ((f) of FIG. 12). In addition, when there exists a node with a different power source state from the expected value that is instructed from the power source interlocking unit 36, the power source monitoring unit 38 repeatedly inquires of the node with the different power source state from the expected value, about the state of the power source until the state of the power source reaches the expected value.

Figure 13:
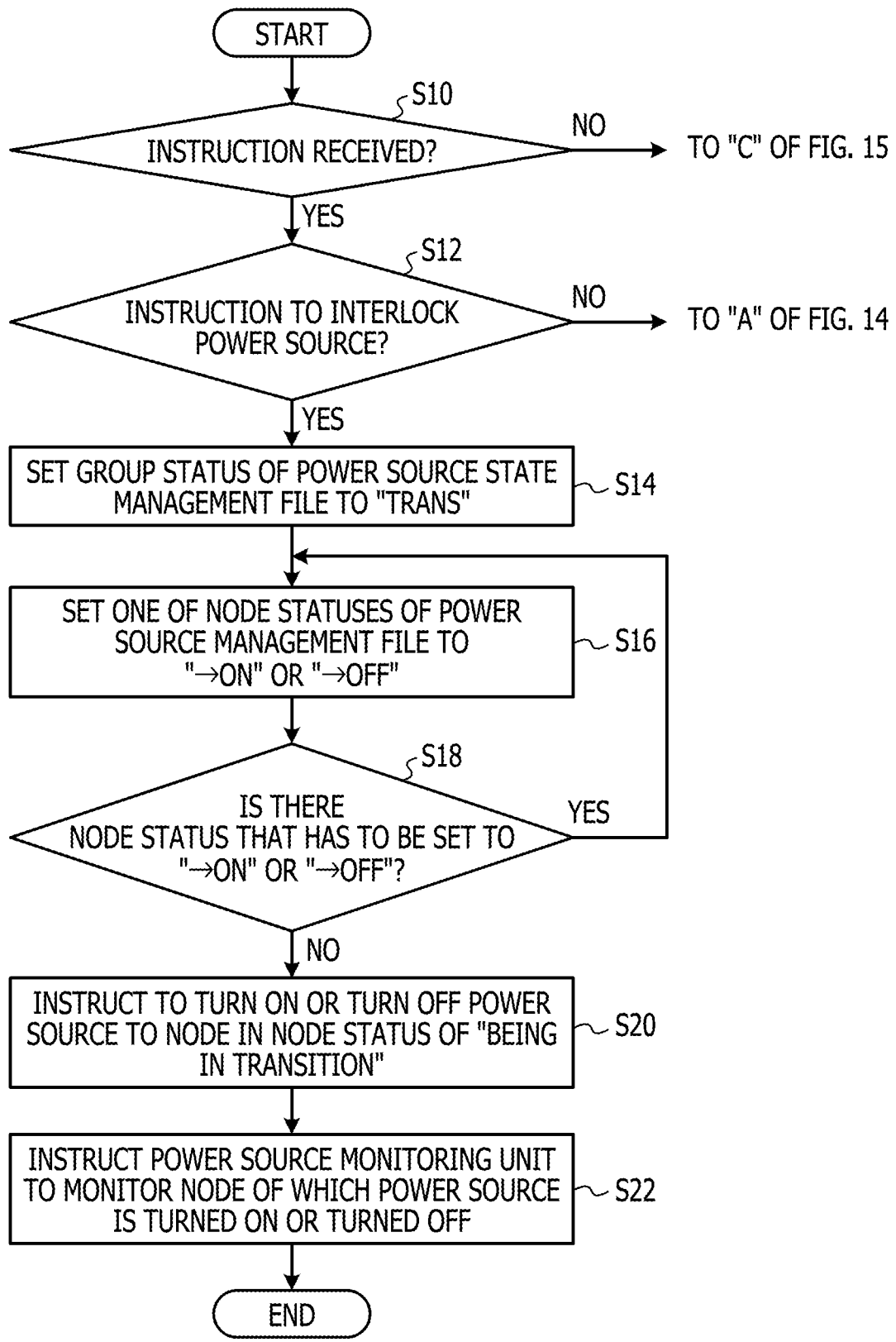
FIG. 13 is a view illustrating an example of an operation of the management device of the server operating as a master node in FIG. 6.

FIG. 13 illustrates an example of the operation of the management device MD of the server SV operating as the master node in FIG. 6. That is, FIG. 13 illustrates an example of a method of controlling the information processing system 102. The operation illustrated in FIG. 13 is repeatedly performed in a predetermined period.

First, in step S10, the instruction determination unit 32 of the system controller CTRL determines whether an instruction from the terminal device TM or an instruction from a master node of another group Gr has been received. When it is determined that the instruction has been received, the instruction determination unit 32 causes the process to proceed to step S12, and when it is determined that the instruction has not been received, the instruction determination unit 32 causes the process to proceed to step S60 illustrated in FIG. 15.

In step S12, the instruction determination unit 32 determines whether the received instruction is an instruction to interlock the turn-on or turn-off of the power sources of the multiple nodes included in a group Gr. When it is determined that the received instruction is an instruction to interlock the turn-on or turn-off of the power sources, the instruction determination unit 32 transfers the received instruction to the power source interlocking unit 36, and the process proceeds to step S14. When it is determined that the received instruction is not an instruction to interlock the turn-on or turn-off of the power sources, the instruction determination unit 32 causes the process to proceed to step S30 illustrated in FIG. 14.

In step S14, the power source interlocking unit 36 of the system controller CTRL sets the group status GST of the power source state management file 46 to the power information "TRNS" indicating that the power sources of the nodes in the group Gr are being transitioned. Next, in step S16, the power source interlocking unit 36 sets the node status NST of any one of the nodes to the power source information "→ON" or "→OFF" indicating that the power source is being transitioned, in the power source state management file 46.

Here, when the instruction to interlock the turn-on of the power sources is received from the terminal device TM, the power source interlocking unit 36 stores the power source information "→ON" in one of the node statuses NST in which the power source information "OFF" or "→OFF" is set. Meanwhile, when the instruction to interlock the turn-on of the power sources is received from the terminal device TM, the power source interlocking unit 36 stores the power source information "→OFF" in one of the node statuses NST in which the power source information "ON" or "→ON" is set. That is, the power source interlocking unit 36 sets the power source information "→ON" or "→OFF" in the node status NST corresponding to the node of which the power source state is to be transitioned. The setting of the node status NST ("ON" or "OFF") corresponding to the node of which the power source is already in the transitioned state is not changed.

Next, in step S18, the power source interlocking unit 36 determines whether there exists a node status NST which has to be set to the state where the power source is being transitioned ("→ON" or "→OFF"), among the node statuses NST corresponding to the respective nodes. When it is determined that there exists a node status NST which has to be set to the state where the power source is being transitioned, the power source interlocking unit 36 causes the process to return to step S16, and when it is determined that there exists no node status NST which has to be set to the state where the power source is being transitioned, the power source interlocking unit 36 causes the process to proceed to step S20.

As for the case where the instruction to interlock the turn-on of the power sources is received from the terminal device TM, for example, in a case where the node statuses NST corresponding to all the nodes are the power source information "→ON" or "ON," the process proceeds to step S20. In addition, as for the case where the instruction to interlock the turn-on of the power sources is received from the terminal device TM, in a case where the node statuses NST corresponding to all the nodes are the power source information "→OFF" or "OFF," the process proceeds to step S20.

In step S20, the power source interlocking unit 36 reads the apparatus information corresponding to the own group Gr in the master group setting file 42. When the instruction to interlock the turn-on of the power source is received from the terminal device TM, the power source interlocking unit 36 instructs the turn-on of the power source to the node indicated by the apparatus information read from the master group setting file 42. In addition, when the instruction to interlock the turn-off of the power source is received from the terminal device TM, the power source interlocking unit 36 instructs the turn-off of the power source to the node indicated by the apparatus information read from the master group setting file 42. The power source interlocking unit 36 performs the instruction of the turn-on or turn-off the power source to the node by using the IPMI.

In addition, when the instruction of the turn-on of the power source is issued to a node in which the turn-on of the power source has been completed or the power source is being transitioned to the turn-on state, the node receiving the instruction ignores the instruction and continues to perform the operation. When the instruction of the turn-off of the power source is issued to a node in which the turn-off of the power source has been completed or the power source is being transitioned to the turn-off state, the node receiving the instruction ignores the instruction and continues to perform the operation. Next, in step S22, the power source interlocking unit 36 outputs an instruction to monitor the state of the power source of the node to which the instruction of the turn-on or turn-off of the power source has been issued, to the power source monitoring unit 38, and ends the process.

Figure 14:
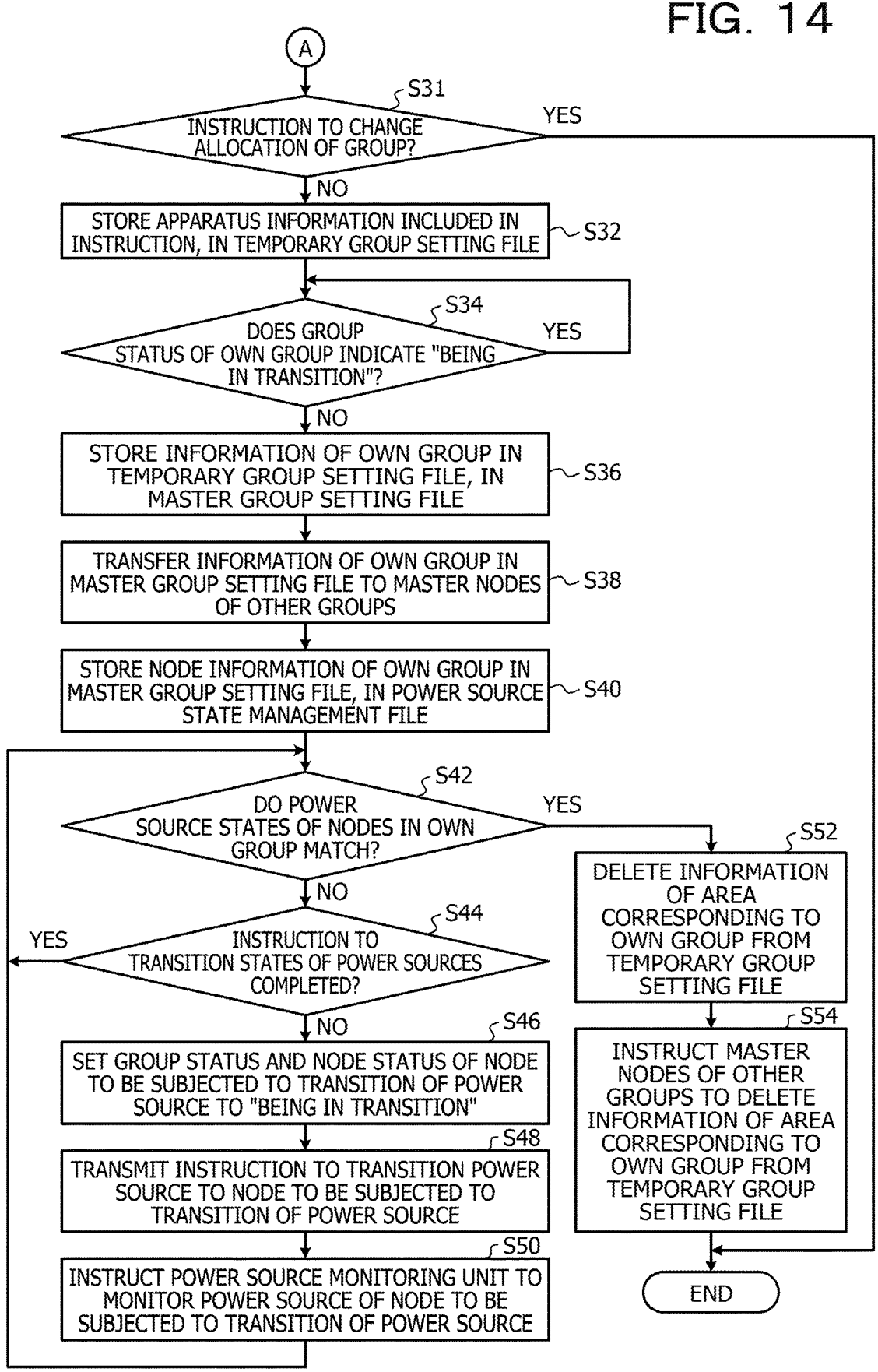
FIG. 14 is a view illustrating the continuation of the operation flow of FIG. 13.

FIG. 14 illustrates a continuation of the operation flow of FIG. 13. In step S32, the instruction determination unit 32 determines whether the received instruction is an instruction to change the allocation of the nodes included in a group Gr. When it is determined that the received instruction is an instruction to change the allocation of the nodes, the instruction determination unit 32 transfers the received instruction to the allocation controller 34, and causes the process to proceed to step 34. When it is determined that the received instruction is not an instruction to change the allocation of the nodes, the process is ended. In step S34, the allocation controller 34 stores the apparatus information included in the received instruction to change the allocation of the nodes in the temporary group setting file 44.

In addition, when an instruction to delete the group Gr is received from the terminal device TM, the allocation controller 34 deletes the apparatus information of the own group Gr in the master group setting file 42. Further, the allocation controller 34 transfers the instruction to delete the apparatus information of the own group Gr from the master group setting file 42, to the master nodes of the other groups Gr. Further, the allocation controller 34 deletes the apparatus information held in the power source state management file 46, and ends the process.

Next, in step S34, the assignment controller 34 refers to the group status GST of the power source state management file 46, and determines whether the nodes included in the own group Gr are being in the transition of the power source. While the nodes included in the own group Gr are being in the transition of the power source, the process of step S34 is repeatedly performed. When it is determined the nodes included in the own group Gr are not being in the transition of the power source, the process proceeds to step S36.

Figure 15:
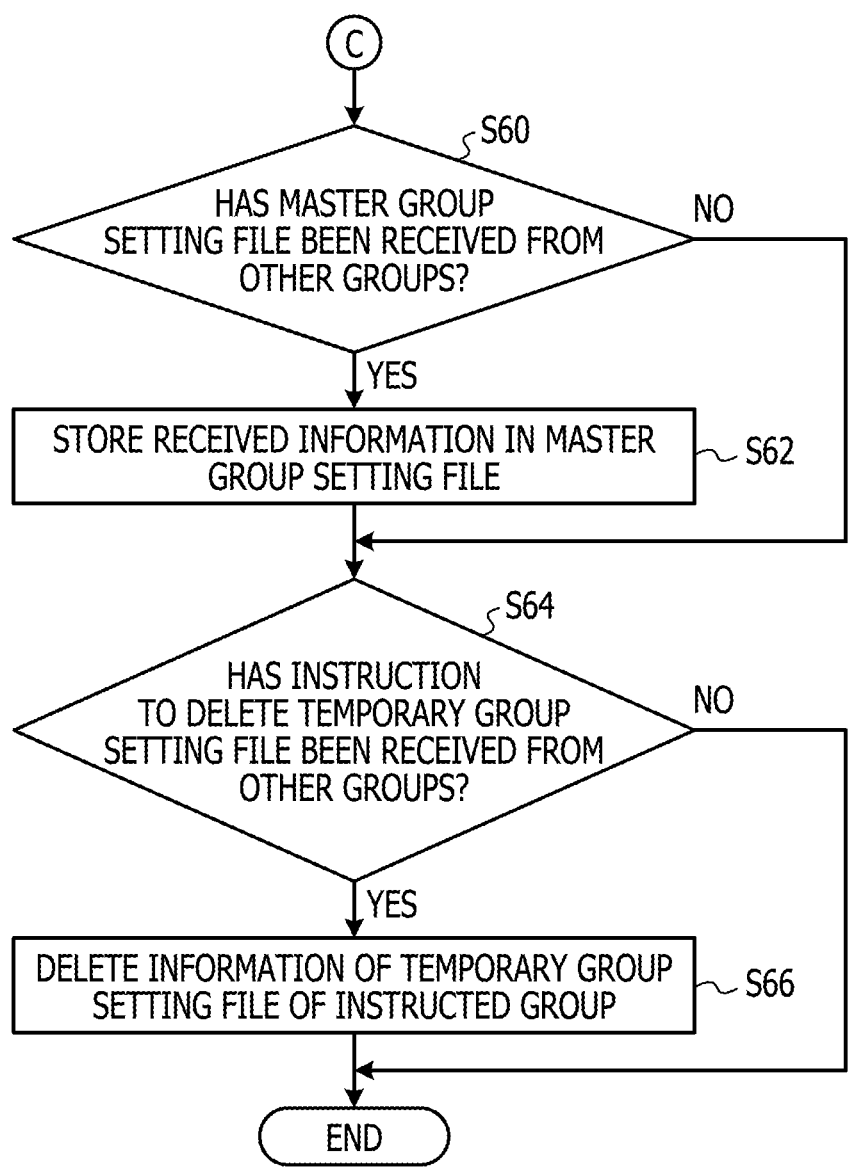
FIG. 15 is a view illustrating the continuation of the operation flow of FIG. 13.

In step S36, the allocation controller 34 stores the apparatus information of the own group Gr in the apparatus information set in the temporary group setting file 44, in the master group setting file 42. Next, in step S38, the assignment controller 34 transmits the apparatus information stored in the master group setting file 42 to the master nodes of the other groups Gr. An example of the operation of the master node of each of the other groups Gr that has received the apparatus information set in the temporary group setting file 44 is illustrated in FIG. 15. Next, in step S40, the allocation controller 34 stores the apparatus information indicating the nodes corresponding to the own group Gr stored in the master group setting file 42, in the power source state management file 46.

Next, in step S42, the power source interlocking unit 36 refers to the power source state management file 46, and determines whether the states of the power sources of all the nodes included in the own group Gr match each other. When it is determined that the states of the power sources of all the nodes match each other, the process proceeds to step S52. When there exists a node with a different power source state, the process proceeds to step S44.

In step S44, when the instruction to transition the power sources has been completed, the power source interlocking unit 36 causes the process to return to step S42, and when no instruction to transition the power sources has been made, the power source interlocking unit 36 causes the process to proceed to step S46. In step S46, the power source interlocking unit 36 sets the group status GST of the power source state management file 46 to the power source information "→ON" or "→OFF" indicating that the power source is being transitioned. Further, the power source interlocking unit 36 sets the node status NST corresponding to the node to be subjected to the transition of the power source in the power source state management file 46, to the power source information "→ON" or "→OFF" indicating that the power source is being transitioned.

Figure 16:
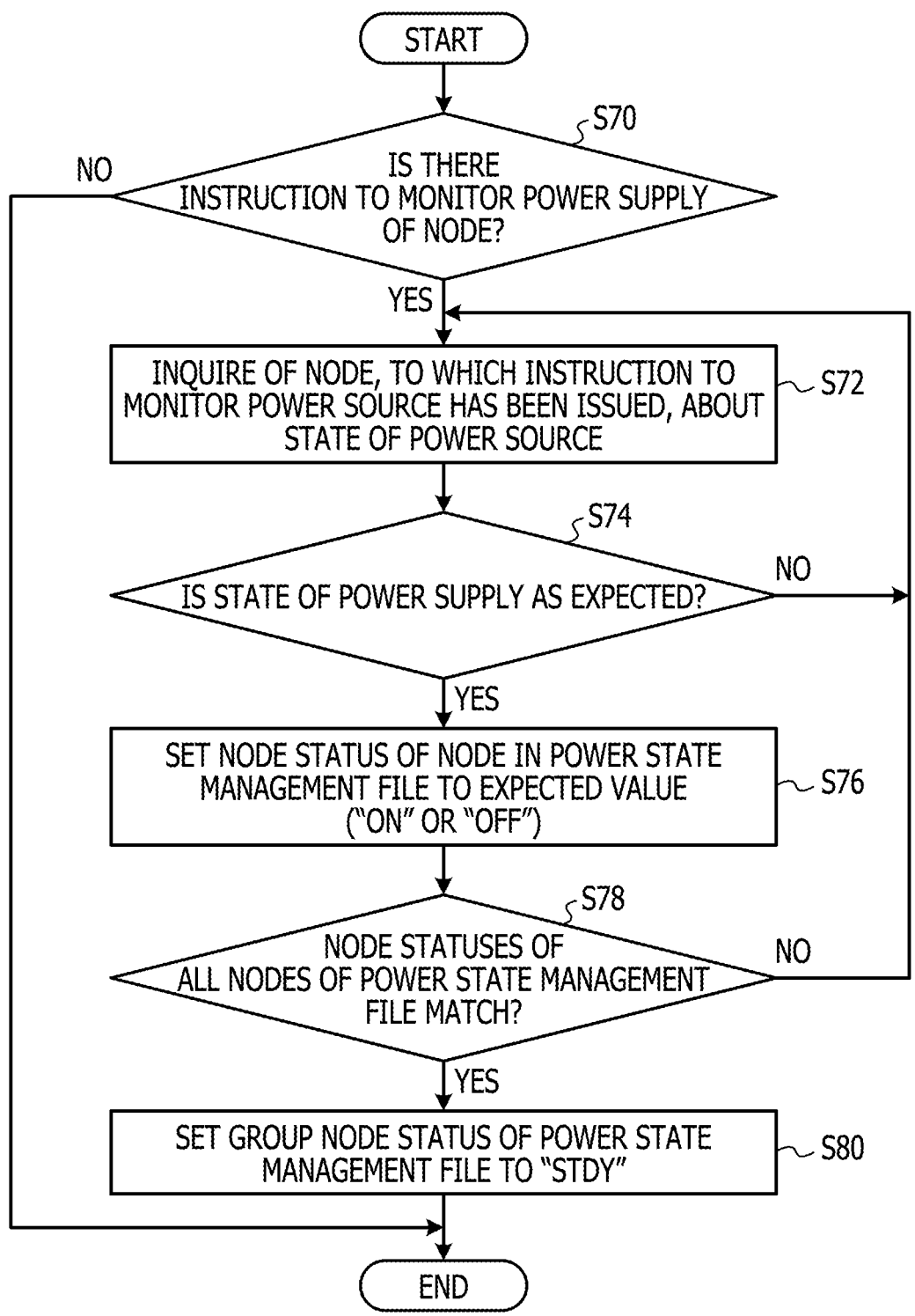
FIG. 16 is a view illustrating an example of an operation of a power source monitoring unit included in the management device of the server operating as a master node in FIG. 6.

Next, in step S48, the power source interlocking unit 36 transfers the instruction to transition the power source to the node corresponding to the node status NST in which the power source information "→ON" or "→OFF" is set. Next, in step S50, the power source interlocking unit 36 instructs the power source monitoring unit 38 to monitor the power source of the node to which the instruction to transition the power source has been made, and the process proceeds to step S42. An example of the operation of the power source monitoring unit 38 that has received the instruction to monitor the power source is illustrated in FIG. 16.

Meanwhile, in step S52, the allocation controller 34 deletes the apparatus information in the area corresponding to the own group Gr in the temporary group setting file 44. Next, in step S54, the allocation controller 34 transmits an instruction to delete the apparatus information held in the area corresponding to the own group Gr in the temporary group setting file 44, and the process is ended. An example of the operation of the master node of each of the other groups Gr that has received the instruction to delete the apparatus information is illustrated in FIG. 15.

FIG. 15 illustrates the continuation of the operation flow of FIG. 13. In step S60, the allocation unit 34 determines whether apparatus information to be set in the master group setting file 42 has been received from any one of the other groups Gr. When it is determined that the apparatus information to be set in the master group setting file 42 has been received, the process proceeds to step S62. When it is determined that the apparatus information to be set in the master group setting file 42 has not been received, the process proceeds to step S64. In step S62, the allocation controller 34 stores the received apparatus information in the master group setting file 42, and the process proceeds to step S64.

In step S64, the allocation controller 34 determines whether an instruction to delete the apparatus information held in the temporary group setting file 44 has been received from any one of the other groups Gr. When it is determined that the instruction to delete the apparatus information held in the temporary group setting file 44 has been received, the process proceeds to step S66. When it is determined that the instruction to delete the apparatus information held in the temporary group setting file 44 has not been received, the process is ended. In step S66, the allocation controller 34 deletes the apparatus information of the area instructed to be deleted in the temporary group setting file 44, and the process is ended.

FIG. 16 illustrates an example of the operation of the power source monitoring unit 38 of the management device MD of the server SV operating as the master node in FIG. 6. That is, FIG. 16 illustrates an example of a method of controlling the information processing system 102. The operation illustrated in FIG. 16 is repeatedly performed at a predetermined period.

First, in step S70, the power source monitoring unit 38 determines whether an instruction to monitor the power source of the node instructed to transition the power source has been received from the power source interlocking unit 36. When it is determined that the instruction to monitor the power source has been received, the process proceeds to step S72. When it is determined that the instruction to monitor the power source has not been received, the process is ended.

In step S72, the power source monitoring unit 38 inquires of the node, to which the instruction to monitor the power source has been issued, about the state of the power source. Next, in step S74, the power source monitoring unit 38 determines whether the information indicating the state of the power source included in the response from the node is the expected value. For example, in step S48 illustrated in FIG. 14, when the power source interlocking unit 36 instructs the turn-on of the power source to the node, the expected value is the turn-on state of the power source ("ON"). In step S48 illustrated in FIG. 14, when the power source interlocking unit 36 instructs turn-off of the power source to the node, the expected value is the turn-off state of the power source ("OFF"). When it is determined that the state of the power source is the expected value, the process proceeds to step S76. When it is determined that the state of the power source is not the expected value, the process proceeds to step S72.

In step S76, the power source monitoring unit 38 sets the node status NST of the node of which power source is to be monitored in the power source state management file 46, to the state indicating the expected value ("ON" or "OFF"). Next, in step S78, the power source monitoring unit 38 determines whether the node statuses NST corresponding to all of the nodes in the power source state management file 46 match each other. When it is determined that the node statuses NST match each other, the process proceeds to step S80. When the node statuses NST do not match each other, the process proceeds to step S72. In step S80, the power source monitoring unit 38 sets the group status GST of the power source state management file 46 to the power source information "STDY" indicating the completion of the transition of the power sources, and the process is ended.

As described above, in the embodiment illustrated in FIGS. 4 to 16 as well, the same effect as illustrated in the embodiment illustrated in FIGS. 1 to 3 may be obtained. For example, even when the instruction to change the allocation of the nodes included in a group Gr is received during the transition of the power sources of the nodes included in the group Gr, the management device MD may wait for the completion of the transition of the power sources, and change the allocation of the nodes. At this time, the management device MD may match the states of the power sources of the nodes included in the group Gr with each other, without receiving an instruction to change the states of the power sources from the terminal device TM. As a result, the operator who operates the terminal device TM may issue the instruction to change the allocation of the nodes included in the group Gr, regardless of whether the power sources of the nodes included in the group Gr are being transitioned, so that the burden to the operator may be reduced, as compared with the related art.

In addition, in the embodiment illustrated in FIGS. 4 to 16, by providing the node status NST indicating the state of the power source of the node in the power source state management file 46, the allocation controller 34 may refer to the power source state management file 46, and determine that the power source of each node is being transitioned. That is, even when each node does not have the function of outputting information indicating that the power source is being transitioned, in response to an inquiry about the state of the power source, the allocation controller 34 may determine that the power source of the node is being transitioned. Further, by referring to the group status GST, the allocation controller 34 may detect that the transition of the power sources of all the nodes included in the group Gr has been completed, and the power sources are in the stable state, without referring to the node status NST of each node. As a result, the time required until the state of the power source of the group Gr is detected may be reduced, as compared with a case where the node status NST is referred to.

By providing the temporary group setting file 44 in each master node, the master group setting file 42 may be suppressed from being directly rewritten based on the instruction to change the allocation of the nodes which has been received from the terminal device TM. As a result, the apparatus information of the own group Gr held by the master group setting file 42 may be suppressed from being inconsistent with the information of the nodes held by the power source state management file 46, so that the control to transition the power sources of the nodes may be accurately performed.

The management device MD is provided in each server SV, so that even when any server SV is allocated to the group Gr, the interlocking of the transition of the power sources of the nodes included in the group Gr may be performed by the management device MD of any one of the servers SV included in the group Gr. Further, even when any server SV is allocated to the group Gr, the change of the allocation of the nodes included in the group Gr may be performed by the management device MD of any one of the servers SV included in the group Gr.

In addition, when receiving the instruction to change the allocation of the nodes of the multiple groups Gr, any one master node of the multiple groups Gr transfers the instruction to change the allocation of the nodes to the master nodes of the other groups Gr. The master node of each group Gr stores the apparatus information included in the instruction to change the allocation of the nodes in the temporary group setting file 44 of the own node. As a result, the terminal device TM may cause the apparatus information to be stored in the temporary group setting file 44 of the master node of each group Gr, without transferring the instruction to change the allocation of the nodes to each of the multiple groups Gr.

In addition, when the power sources of the nodes in the group Gr are not being transitioned, the master node of each group Gr stores the apparatus information of the own node held by the temporary group setting file 44, in the master group setting file 42. Then, the master node transfers the apparatus information of the own node held by the temporary group setting file 44 to the master nodes of the other groups Gr. The master nodes of the other groups Gr to which the apparatus information has been transferred stores the received apparatus information in the master group setting file 42. As a result, the operation of changing the allocation of the nodes in all the groups Gr may be performed based on the instruction to change the allocation of the nodes that has been received in one of the groups Gr. Thus, the terminal device TM may perform the operation of changing the allocation of the nodes in each group Gr, without transferring the instruction to change the allocation of the nodes to each of the multiple groups. In addition, the operator who operates the terminal device TM may issue the instruction to change the allocation of the nodes of the multiple groups Gr at an arbitrary timing, without being conscious of the states of the power sources of the multiple nodes included in each of the multiple groups Gr.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
   a first electronic apparatus group of a plurality of first electronic apparatuses; and
   a management device including:
   a first memory configured to hold first apparatus information for identifying each of electronic apparatuses included in the first electronic apparatus group;
   a second memory configured to hold first power source information indicating first states of power sources of the respective first electronic apparatuses; and
   a first processor coupled to the first memory and the second memory and the first processor configured to:
   store the first power source information in the second memory;
   instruct, upon receiving a first instruction, the first electronic apparatuses identified by the first apparatus information held in the first memory to transition the respective first states, the first instruction instructing to turn on or turn off the power sources;
   receive a second instruction to add a new electronic apparatus to the first electronic apparatus group;
   suppress, in a case where the first power source information held in the second memory indicates that any one of the first states is being transitioned, second apparatus information of the new electronic apparatus from being stored in the first memory; and
   store the second apparatus information in the first memory in a case where the first power source information held in the second memory indicates that transition of all the first states has been completed, and match a second state of a power source of the new electronic apparatus with the first states.

2. The information processing system according to claim 1, wherein
   the management device further includes a third memory configured to hold second power source information indicative of a third state of power sources of the first electronic apparatus group, and
   the first processor is configured to:
   store in the third memory, when the second state is different from the first states, the second power source information indicating that states of the power sources of the first electronic apparatus group are being transitioned and instruct the new electronic apparatus to transition the second state;
   store in the third memory, when the second state matches the first states, the second power source information indicating completion of the transition of the power sources of the first electronic apparatus group;
   refer to third memory; and determine that the transition of all the power sources of the first electronic apparatus group has been completed when the second power source information held in the third memory indicates the completion of the transition of the power sources.

3. The information processing system according to claim 1, wherein
the management device further includes a third memory configured to hold third apparatus information for identifying each of the electronic apparatuses included in the first electronic apparatus group to which the new electronic apparatus has been added, and
the first processor is configured to:
store, upon receiving the second instruction, the third apparatus information in the third memory based on the first apparatus information and the second apparatus information; and
suppress, in a case where the first power source information held in the second memory indicates that a power source of any one of the first electronic apparatuses is being transitioned, the third apparatus information held in the third memory from being stored in the first memory.

4. The information processing system according to claim 1, wherein
a second electronic apparatus among the first electronic apparatuses is an information processing apparatus including a second processor configured to process information,
the management device is included in the information processing apparatus and operated by a power source different from a power source that operates the second processor, and
the first processor is configured to perform management of power sources of the electronic apparatuses included in the first electronic apparatus group when the information processing apparatus receives the first instruction or the second instruction.

5. The information processing system according to claim 1, further comprising second electronic apparatus groups different from the first electronic apparatus group,
the first processor is configured to:
perform, when the information processing apparatus receives a third instruction, control to change allocation of the electronic apparatuses included in the first electronic apparatus group, and output the third instruction to one of information apparatuses included in each of the second electronic apparatus groups to cause management devices of information processing apparatuses that receive the third instruction with respect to the respective second electronic apparatus groups, the third instruction instructing to change allocation of the electronic apparatuses included in the electronic apparatus groups included in the information processing system, the change being to add or delete an electronic apparatus with respect to the electronic apparatus groups.

6. The information processing system according to claim 5, wherein the management device further includes a third memory configured to hold third apparatus information for identifying electronic apparatuses after the change of the allocation, in association with each of the plurality of electronic apparatus groups, and
the first processor is configured to:
store, upon receiving the third instruction, the third apparatus information in the third memory; and
suppress, in a case where the first power source information held in the second memory indicates that a power source of any one of the first electronic apparatuses is being transitioned, the third apparatus information held in the third memory from being stored in the first memory.

7. The information processing system according to claim 6, wherein
the first processor is configured to output, upon storing the third apparatus information held in the third memory into the first memory, an instruction to each of the management devices of the second electronic apparatus groups to hold the third apparatus information.

8. A management device, comprising:
a first memory configured to hold first apparatus information for identifying each of electronic apparatuses included in a first electronic apparatus group;
a second memory configured to hold first power source information indicating first states of the power sources of the respective first electronic apparatuses; and
a first processor coupled to the first memory and the second memory and the first processor configured to:
store the first power source information in the second memory;
instruct, upon receiving a first instruction, the first electronic apparatuses identified by the first apparatus information held in the first memory to transition the respective first states, the first instruction instructing to turn on or turn off the power sources;
receive a second instruction to add a new electronic apparatus to the first electronic apparatus group;
suppress, in a case where the first power source information held in the second memory indicates that any one of the first states is being transitioned, second apparatus information of the new electronic apparatus from being stored in the first memory; and
store the second apparatus information in the first memory in a case where the first power source information held in the second memory indicates that transition of all the first states has been completed, and match a second state of a power source of the new electronic apparatus with the first states.

9. A method of controlling information processing system, the method comprising:
storing in a second memory, by a computer, first power source information indicating first states of power sources of respective first electronic apparatuses included in a first electronic apparatus group;
instructing, upon receiving a first instruction, the first electronic apparatuses identified by first apparatus information held in a first memory to transition the respective first states, the first instruction instructing to turn on or turn off the power sources;
receiving a second instruction to add a new electronic apparatus to the first electronic apparatus group;
suppressing, in a case where the first power source information held in the second memory indicates that any one of the first states is being transitioned, second apparatus information of the new electronic apparatus from being stored in the first memory; and
storing the second apparatus information in the first memory in a case where the first power source information held in the second memory indicates that transition of all the first states has been completed, and matching a second state of a power source of the new electronic apparatus with the first states.

* * * * *